US009225712B2

(12) United States Patent
Geller

(10) Patent No.: US 9,225,712 B2
(45) Date of Patent: Dec. 29, 2015

(54) ENHANCED SECURITY FOR ELECTRONIC COMMUNICATIONS

(75) Inventor: Alan S. Geller, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 149 days.

(21) Appl. No.: 13/619,921

(22) Filed: Sep. 14, 2012

(65) Prior Publication Data

US 2013/0081111 A1 Mar. 28, 2013

Related U.S. Application Data

(63) Continuation of application No. 11/396,298, filed on Mar. 31, 2006, now Pat. No. 8,312,523.

(51) Int. Cl.
*H04L 29/06* (2006.01)
*G06F 21/31* (2013.01)
*G06F 21/41* (2013.01)

(52) U.S. Cl.
CPC ............ *H04L 63/0815* (2013.01); *G06F 21/31* (2013.01); *G06F 21/41* (2013.01); *G06F 2221/2119* (2013.01); *H04L 63/123* (2013.01)

(58) Field of Classification Search
CPC ..................... H04L 29/06768; H04L 63/0815; H04L 63/123; G06F 21/31; G06F 21/41
USPC ............................... 726/8; 713/170, 180, 182
See application file for complete search history.

(56) References Cited

U.S. PATENT DOCUMENTS

| 5,649,099 A | 7/1997 | Theimer et al. |
| 6,023,509 A | 2/2000 | Herbert et al. |
| 7,039,606 B2 | 5/2006 | Hoffman et al. |
| 7,080,077 B2 | 7/2006 | Ramamurthy et al. |
| 7,117,528 B1 | 10/2006 | Hyman et al. |
| 7,137,006 B1 | 11/2006 | Grandcolas et al. |
| 2002/0184507 A1* | 12/2002 | Makower et al. ............. 713/182 |
| 2003/0033545 A1 | 2/2003 | Wenisch et al. |

(Continued)

OTHER PUBLICATIONS

Bajaj, S. et al., "WS Federation: Passive Requestor Profile", Jul. 8, 2003, retrieved from ftp://www6.software.ibm.com/software/developer/library/ws-fedpass.pdf, 32 pages.
Eastlake, D., et al., "XML-Signature Syntax and Processing—W3C Recommendation Feb. 12, 2002", IETF W3C, retrieved Feb. 8, 2006, from http://www.w3.org/TR/xmldsig-core/, 64 pages.
"Flickr Authentication API," Jun. 15, 2005, retrieved on Feb. 5, 2008, from http://web.archive.org/web/20050621004352/flickr.com/services/api/, 4 pages.

(Continued)

*Primary Examiner* — Jeffrey Pwu
*Assistant Examiner* — Thong Truong
(74) *Attorney, Agent, or Firm* — Seed IP Law Group PLLC

(57) ABSTRACT

Techniques are described for providing enhanced security for electronic communications, such as by including in a message sent between two services a digital signature that is generated by using secret information known to the services, so that the recipient receives assurance regarding the sender's identity if the recipient can replicate the received digital signature using the secret information known to the recipient. In some situations, the enhanced security is used in communications to and/or from an access manager system that provides single sign-on functionality and other functionality to other services for use with those services' users, such as to prevent malicious phishers from inappropriately gaining access to user information. Various services may use the enhanced security techniques when interacting with the access manager system at various times, such as to initiate sign-on for a user and/or to take subsequent action on behalf of a signed-on user.

23 Claims, 17 Drawing Sheets

(56) References Cited

U.S. PATENT DOCUMENTS

2003/0154403 A1 8/2003 Keinsley et al.
2003/0159072 A1 8/2003 Bellinger et al.
2004/0003248 A1 1/2004 Arkhipov
2004/0111645 A1 6/2004 Baffes et al.
2004/0210771 A1 10/2004 Wood et al.
2006/0218630 A1 9/2006 Pearson et al.
2007/0115927 A1* 5/2007 Pearson .................. 370/352

OTHER PUBLICATIONS

"Flickr Authentication API Web Applications How-To," Nov. 7, 2005, retrieved on Feb. 5, 2008. from http://web.archive.org/web/20051107194341/http ://www.flickr.com/services/api/auth.howto.web.html, 2 pages.

"Flickr API Documentation," Jun. 21, 2005, retrieved on Feb. 5, 2008, from http://web.archive.org/web/20050621004352/flickr.com/services/api/, 3 pages.

* cited by examiner

Example Access Manager Customer Registration Information

Please enter information about your site and contact information ⎬ 201

202a { AM Customer Name: ⎵
       Website URL: ⎵

202b { Contact Name: ⎵
       Contact Email: ⎵               ⎬ 202
       Contact Phone: ⎵

202c { Type of site:           | Webmail Provider ▼ |
       Year site started:      | 2003 ▼ |
       Number of Current Users | < 500 ▼ |

203 — [ Register ]        204 — [ Reset ]

*Fig. 2A*

Example Screen for Access Manager Customer
to Configure Information Gathering

Please configure what information to gather from your users.

213 {
- ☐ Name
- ☐ Shipping Address.
- ☐ Billing Address
- ☐ Email Address
- ☐ Occupation
- ☐ Phone Numbers
  ⋮

214 {
Recheck Every [6 mos ▽]
Recheck Every [Year ▽]

215 {
- ☐ Log Sign On
- ☐ Log Sign Out
  ⋮

Optionally specify valid values

216 {
Email Address
　Ends With
　　☐ .com  ☐ .edu  ☐ .net  ☐ .org  ☐ .us
　　☐ Exclude free mail providers
　⋮

Optionall specify format
　Phone Number [999-999-9999 ▽]

*Fig. 2D*

Example Interface for Access Manager Customer
to Configure Delegations of Authority 217 { Please configure what affiliated services can act on behalf of your users.

219 {
[X] AM Provider's Payment Service
[X] AM Provider's Recommendation Service Most Popular 221 {
[ ] ABC Payment Service            (Rating 4.0 / 5.0)
[ ] XYZ Customer Satisfaction Service 223 — Other Services

| Affiliated Services | Service Ranking | Service Provider |
|---|---|---|
| Referral Program AAA | ● ● ● ● ○ | DEF |
| Affilitate Service BBB | ● ● ● ○ ○ | GHI |
| ⋮ | | |

[Customer Logo]

Example Co-branded Information Gathering

Please provide the following information: } 323

Shipping Address

| | |
|---|---|
| Address 1 | [          ] |
| Address 2 | [          ] |
| City | [          ] |
| State | [ ▽ ] |
| Zipcode | [          ] |
| Telephone | [          ]  (ex. 212-555-5555) } 327 |

} 325

How are you feeling today?  [ Excellent ▽ ]

How do you rate your experience with us to date?  [ Good ▽ ]

} 329

[ Submit ]   [ Reset ]  } 331

*Fig. 3B*

ENHANCED SECURITY FOR ELECTRONIC COMMUNICATIONS

CROSS-REFERENCE TO RELATED APPLICATIONS

This application is a continuation of co-pending U.S. application Ser. No. 11/396,298, filed Mar. 31, 2006 and entitled "Enhanced Security for Electronic Communications," which is hereby incorporated by reference in its entirety.

TECHNICAL FIELD

The following disclosure relates generally to techniques for providing enhanced security for electronic communications, such as by including a digital signature in a message between two services that is generated using secret information known to the services, so that the recipient receives assurance regarding the sender's identity if the recipient can replicate the received digital signature using the secret information known to the recipient.

This application is also related to U.S. patent application Ser. No. 11/396285, filed concurrently and entitled "Customizable Sign-On Service," which is hereby incorporated by reference in its entirety.

BACKGROUND

Use of computers in daily life has become ubiquitous, such as to enable users to access and use a variety of types of remote services over the Internet (e.g., via Web sites) or via other access mechanisms (e.g., cellphone networks). For example, some such services may provide various types of information (e.g., current news or reference material), while others may provide a variety of types of activities and capabilities (e.g., online banking, online shopping, email or other messaging services, etc.). While some services may provide information and capabilities to anyone, many others are restricted to authorized users, such as to protect the privacy of user information by making it available only to authorized users (e.g., to require a user to login to a email service before making the user's email available), to manage user data used for the activities being performed (e.g., for an online merchant to store financial and shipping information for a user to facilitate the user's shopping, such as part of an account maintained for the user), and to ensure that users have provided appropriate payment or satisfied other conditions for use of the service.

In order to be able to sign on (or "logon" or "login") to a service to demonstrate authorization to access restricted information or functionality, users must typically first register with the service and obtain appropriate sign-on information (e.g., a username and password) unique to that service. However, as such services proliferate that each have unique sign on information, users are inconveniently forced to remember numerous distinct sets of sign-on information for different Internet sites. In addition, many operators of Internet sites and other providers of such services would prefer to be relieved of the burden of providing functionality to enable such sign on of user and to maintain user sign-on and other authentication data.

In an attempt to address these situations, single sign-on systems have been created in which a user creates a single set of sign-on information that enables access to a group of multiple affiliated services or systems. Unfortunately, current single sign-on systems have a variety of problems. For example, many operators of services are reluctant to use sign-on functionality provided by another operator. This reluctance may be due to a lack of consistency in the users' experience when interacting with the sign-on system (e.g., due to a lack of consistent branding or other consistent appearance and functionality), because available sign-on systems may not provide functionality that is desired, etc. In addition, service operators and users may have concerns regarding security, such as fears that imposters may be able to impersonate a user or service operator in interactions with the single sign-on system and thus improperly obtain access to restricted information or functionality.

Thus, it would be beneficial to provide techniques to improve single sign-on services and to provide other benefits.

BRIEF DESCRIPTION OF THE DRAWINGS

FIGS. 2A-2E illustrate examples of interactions between an access manager and a service acting as a customer of the access manager in order to customize functionality to be provided to users of the customer service.

FIGS. 3A-3B illustrate examples of a customized sign-on process provided by the access manager to users on behalf of a customer service.

DETAILED DESCRIPTION

Figure 1A:
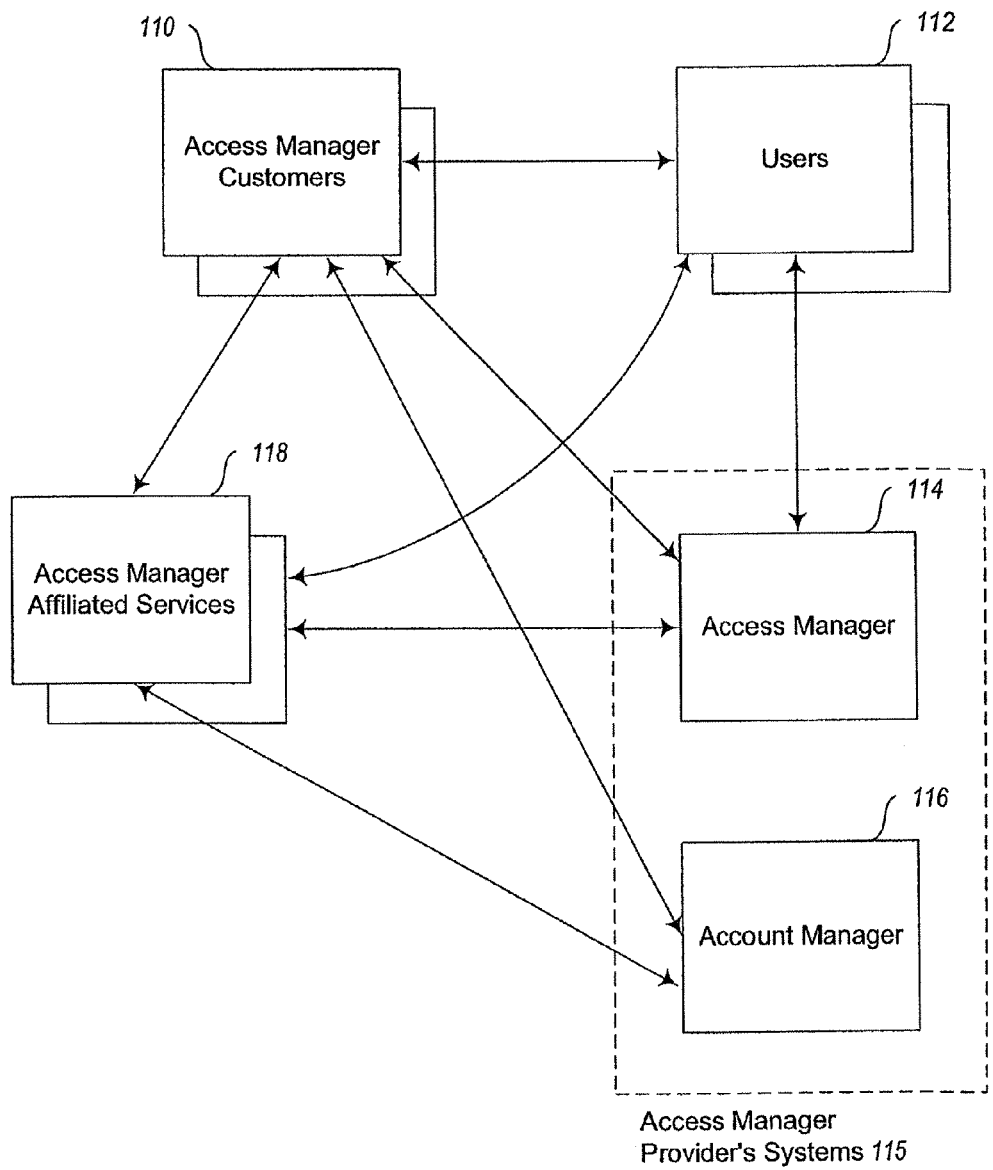
FIGS. 1A-1C illustrate examples of various types of interactions between an access manager system, services and users.

Techniques are described for providing customizable functionality for interacting with users, such as via an access manager system that provides single sign-on functionality and other functionality to other services. In some embodiments, an operator of a Web site or other service available to users may interact with the access manager system to customize and otherwise configure single sign-on functionality and/or other functionality that the access manager system will make available to users of the service. The access manager system may provide such functionality to other services in various ways in various embodiments, such as by enabling initial configuration to be performed by an operator of a service in an interactive manner and by enabling customized functionality to be provided to users of the service in a programmatic manner via an API ("application programming interface") of the access manager system. In at least some such embodiments, the access manager system maintains various sign-on and other account information for various users, and provides single sign-on functionality for those users using that maintained information on behalf of multiple unrelated services with which those users interact. In addition, in at least some embodiments the services on whose behalf the access manager system provides the customized functionality are each customers of the access manager system, such as for customer services that have previously registered with the access manager system in order to configure the customized functionality to be provided (e.g., in exchange for a fee).

In some embodiments, the access manager may allow a variety of types of customizations to single sign-on functionality and/or other functionality available from the access manager. An operator of a customer service may configure the various types of customizations so that user interaction with the access manager on behalf of the customer service is customized for the particular customer service. For example, in at least some embodiments such types of customizations may include various types of co-branding for the service to be used by the access manager when interacting with users of the service, such as to include various information configured for the service with each of one or more groups of information to be presented to users (e.g., one or more Web pages to be displayed to users), such as one or more indicated images (e.g., logos), indicated text, indicated user-selectable links, other indicated user-selectable controls (e.g., a displayed menu bar, such as available from an indicated URL ("Uniform Resource Locator") or from executing indicated code), capabilities provided from executing indicated code, etc. In addition, in at least some embodiments customizations to functionality available from the access manager include various types of information gathering from users of the service during interactions with the access manager, such as to collect information from the users based on one or more predefined questions selected by an operator of the service and/or one or more questions specified by the service operator (e.g., demographic information about the user, preference information, information specific to the user for use by the service in performing its operations, etc.). Co-branding and information gathering customizations are discussed in greater detail below.

In some embodiments, after a user interacts with the access manager to complete a customized sign-on process for a service, the access manager provides a credential to the service for the user, such as to indicate that the user is an authorized user for the service and/or to represent the user so that the service may make subsequent requests to perform actions on behalf of the user (e.g., to make payments for the user, to modify stored account information for the user, etc.). The credentials may take a variety of forms in various embodiments, such as to include information specific to the user (e.g., a unique username or other identifier for the user, an actual name or other identifying information for the user, information gathered from the user during the customized sign-on process, etc.), whether in an encrypted or unencrypted form, or to instead merely be information that the access manager can later map to the user if returned (e.g., a unique number for the access manager or relative to a service). In addition, in at least some embodiments, a credential provided to a service on behalf of a user is treated by the access manager as being specific to the service, such that a later request to use the credential on behalf of the user will be treated as valid only if provided by or on behalf of the service. Credentials may also have a variety of other types of characteristics in at least some embodiments. For example, a particular credential may be valid for only a limited period of time and/or for only certain types of activities or operations on behalf of a user. If so, the access manager may restrict use of the credentials based on such characteristics. Additional details related to credentials are discussed below.

In some embodiments, additional types of customizations are allowed by the access manager for at least some services related to types of activities that the services are allowed to take. For example, the types of actions that some services are allowed to take for their signed-on users may be limited in various ways, such as to reflect a degree of trust granted to the service by the access manager—as one example, credentials may in some embodiments be valid for only limited periods of time, and if so some services may be authorized to refresh their users' credentials to extend their period of validity in at least some circumstances (e.g., for up to a specified number of times, for up to a specified total period of validity, in an unlimited and unrestricted manner, etc.). In addition, in at least some embodiments, customizations allowed by the access manager for at least some services include one or more types of delegation of authority that a primary service may be able to provide to another secondary service to take actions on behalf of a user, such as to reflect a degree of trust granted by the access manager to the primary service and/or to the secondary service. For example, at least some primary services to which credentials are provided may be authorized to delegate authority to other services to use such credentials in various ways, including to use the credentials to take at least some types of actions on behalf of the represented users, to perform refreshing of credentials with limited periods of validity in at least some circumstances, to request issuance of a new credential for the user that is specific to the secondary service (e.g., when credentials are only effective for the service to which they are originally issued), etc. Additional details related to types of delegation of authority are included below.

The types of customizations that will be made available to a service by the access manager may be determined in various ways in various embodiments, such as in an automatic manner based on information available about the service and/or the operator of the service. For example, some types of customizations may provide greater security and liability risks if a malicious service (or a malicious party that attempts to impersonate or otherwise act on behalf of a benign service) is allowed to perform them. With respect to co-branding types of customizations, allowing a service to add text and/or an image to be displayed to users carries relatively little risk (assuming that the context of the text is not offensive or illegal). Conversely, allowing a service to specify executable code that the access manager will use when generating information to be provided to a user or that will be included with the information provided to a user (e.g., a Java applet included as part of a Web page sent to the user) may carry relatively high risk (e.g., to allow the service-specified code to inappropriately obtain information about the user, such as by monitoring sign-on information provided by the user to the access manager that would not otherwise be available to the service). Additional details related to determining types of customizations to make available to a service are included below.

In addition, in some embodiments various techniques are used to inhibit malicious parties from performing unauthorized activities, such as to prevent phishing attempts in which malicious parties attempt to impersonate actual authorized parties. For example, in order to inhibit malicious users from attempting to interact with the access manager while impersonating services authorized to perform such interactions, additional security techniques may be used to authenticate some or all messages sent from at least some of the services. In particular, in some embodiments each service that is authorized to interact with the access manager is given at least one unique secret access key known to the service and to the access manager, and the secret access key of a service is then used by the service when sending a message or other communication to the access manager so that the access manager can verify that the sender of the message is actually the service. For example, each such message from a service may include an indication of a unique identifier for the service, and may also include a digital signature that is generated using the secret access key based on at least a portion of the message contents. When the access manager receives such a message, the access manager can use the service identifier to identify the service and to retrieve the secret access key for that service, and can then generate its own digital signature in the same manner using the retrieved secret access key and the same portion of the message contents. If the digital signature generated by the access manager matches the digital signature included in the message by the sender, the access manager can verify that the sender has access to both the unique identifier and the secret access key for the service, and thus it is highly likely that the sender is actually the service. A secret access key may take a variety of forms in various embodiments, such as a shared secret, a PKI ("Public Key Infrastructure") key pair, an X.509 certificate, a secret generated using hard tokens, etc. Other security techniques may further be used in at least some embodiments, and additional details regarding the use of secret access keys are included below.

For illustrative purposes, some embodiments are described below in which specific types of services configure specific types of customizations of specific types of functionality provided by an access manager system to specific types of users of the services in specific manners. However, it will be appreciated the described techniques can be used in a wide variety of other situations, and that the invention is not limited to the exemplary details provided.

FIG. 1A illustrates examples of various types of interactions between an access manager system, services, and users. In particular, FIG. 1A illustrates interactions between an access manager system 114, services 110 that are customers of the access manager, users 112 of the customer services, optional other secondary services 118 that are affiliated with the customer services, and an account manager system 116. In this example, the account manager 116 and access manager 114 are both provided as part of a group of systems 115 provided by a single entity (e.g., with the account manager performing various actions on behalf of users with accounts with the access manager if requests are received from authorized parties), and in some embodiments at least some of the affiliated services 118 may also be part of the systems 115. Various messages occur between the illustrated systems, services and users, such as the following: messages between users and the access manager system as part of establishing accounts for the users (e.g., with sign-on information), messages between customer services and the access manager to configure customized functionality for the customer services, messages between users and the customer services (including initial interactions in which the users are re-directed to interact with the access manager to participate in a sign-on process customized to the customer services), messages between the customer services and the account manager system (e.g., to perform activities on behalf of users who have signed onto the customer services), messages between the customer services and the affiliated secondary services (e.g., to perform activities on behalf of users who have signed onto the customer services), and messages between the affiliate services and the access manager and account manager systems (e.g., on behalf of users who have signed onto the customer services). In addition, at least some of the messages involving services may use digital signatures (not shown) based on secret access keys of the services (e.g., messages between the customer services 110 and/or affiliate services 118 and the access manager 114, account manager 116, and other customer services or affiliate services).

Figure 1B:
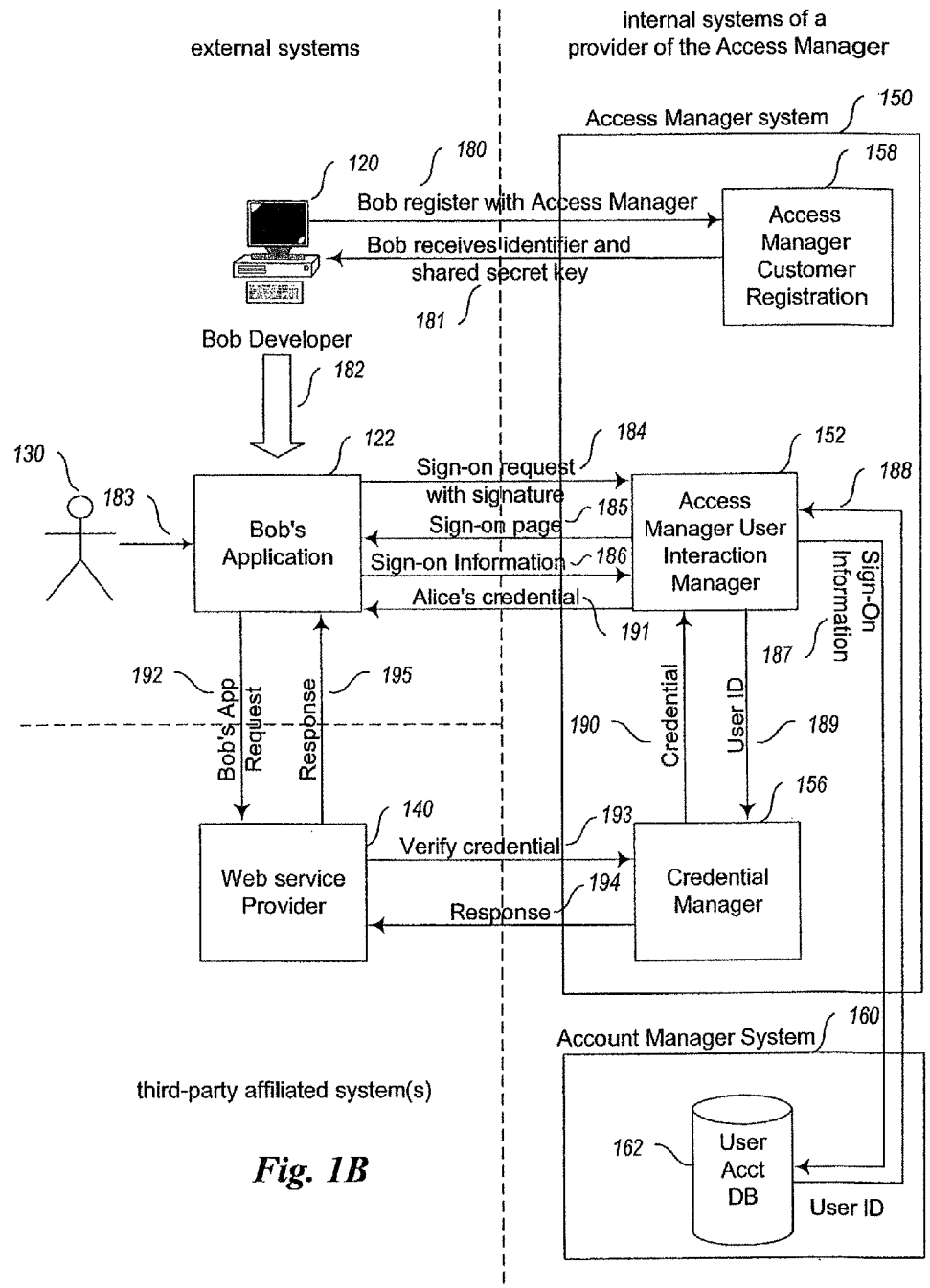

FIG. 1B illustrates one particular example of various types of interactions between an access manager system, services, and users, and in particular illustrates an embodiment in which a customer service is being provided by an application of an application developer rather than a Web site. In particular, the application developer 120 (who is named "Bob" in this example) initially registers 180 with the access manager system 150 for the service to be provided by the developer's application 122, such as by interacting with a customer registration process 158 in this example (e.g., as may be provided by a Customer Registration Manager component). In this example, the application 122 is an application program (e.g., for execution on a general-purpose personal computer) that provides services and/or other functionality to end-users of the application, although in other embodiments such an application may instead have a variety of other forms, such as a Web application, a downloadable applet or other executable code, a client and/or server application, a mobile application (e.g., for execution on a cellular telephone or other form of mobile computing device), etc. As part of step 180, the developer may supply various pieces of information, including contact information and information about the application 122 (and optionally a copy of the application). As part of the registration interactions 180, the developer may configure various customizations for later use by end-users of the application, such as co-branding, information gathering, and authority delegation according to a level of permissions granted to the developer by the access manager system. Alternatively, some customizations may not be used, such as to not configure co-branding if the application will directly interact with an end-user to obtain sign-on information that is then programmatically sent to the access manager system for verification. In addition, in embodiments such as that illustrated, in which the end-users of the application will interact with a graphical user interface provided by the application 122, the application may be contractually or otherwise obligated to provide at least some information to the end-users via the graphical user interface in a particular manner. Such information may be, for example, related to signing on with the access manager system that is presented to end-users in a manner that is co-branded with a brand of the access manager. Alternatively, the application may be obligated to provide other types of information or functionality specific to the access manager, and/or to employ various specified security measures to protect sign-on information for the end-users. After registration, the developer may receive 181 various information from the access manager, such as an indication of a secret key to be used (or a confirmation of a secret key specified by the developer as part of the interaction 180) and a non-secret unique identifier for the application (e.g., an identifier that is associated with the secret access key). After the developer distributes 182 the application to various end-users 130, an end-user may use the application to obtain various types of functionality.

An example user 130 then interacts 183 with the application, such as by requesting an operation in which the user will sign-on to use one or more Web services provided by a remote third-party Web service provider 140 (e.g., a Web service provider with which the user has an established account). Web services may allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI, such as a URL that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services. In some situations, the application 122 and Web service provider 140 may have a predefined relationship, while in other embodiments the application may merely interact with a defined API for the provided Web service on behalf of the application's end-users without such a predefined relationship, such as if the Web service provider is also a customer of the Access Manager system and is configured to accept and use credentials of the Access Manager system to represent users.

After the user request for the operation that triggers the sign-on, a sign-on request message is generated by the application (e.g., with a digital signature generated using the application's secret key to verify that the requestor is the application) and sent 184 to user interaction manager process 152. If the message is verified, the access manager may optionally return 185 sign-on information to be used by the application in gathering sign-on information from the user (e.g., indications of questions to ask the user to gather information, or one or more pages or screens to be displayed to the user if the application is so designed), and the application may perform the sign-on process with the user to gather the various sign-on information (which in this example reflects an account that the user has previously established with the access manager system). The gathered information may then be sent 186 to the access manager user interaction manager 152. In other embodiments, the application may instead gather sign-on information from the user without any initial interaction with the access manager system, and send the sign-on information for the user along with the initial request 184 (e.g., depending on the level of permissions granted the application), although such a situation may expose the end-user's sign-on information to the application. When the access manager user interaction manager 152 receives the sign-on information, it sends 187 the sign-on information to an account manager system 160, which uses information in a user accounts database ("DB") 162 to verify the sign-on information. An indication of user authentication is then sent 188 back to the access manager user interaction manager, such as a user ID or an error message. If the sign-on information was valid, a request is sent 189 to the credential manager 156 (e.g., with the user ID), and the credential manager generates a credential representing the user for use by the application and returns 190 the credential to the access manager user interaction manager. After the access manager user interaction manager receives the credential, it sends 191 the credential back to the application.

The application then generates a Web service request and sends 192 it to the Web service provider 140, with the request optionally including a digital signature that is generated using the application's secret access key. When the Web service provider 140 receives the request, it optionally verifies the identity of the requestor using the digital signature if attached (such as by sending a request to the Access Manager to request the verification, not shown). In addition, the Web service provider verifies the user credential in this example by sending 193 the credential to the credential manager, which generates the appropriate response (e.g., to validate the credential) and sends 194 it to the Web service provider. When the credential is validated, the Web service provider provides the requested Web service for the user, and sends 195 a response to the application. The application can then provide corresponding information and/or functionality to the user based on the response. In some embodiments, the application can further make various additional types of Web service and other requests, such as to interact directly with the account manager system to make changes to the user account or to retrieve data from the user account database 162. After all the requests are done, the user may sign out via the application or just allow the credential to expire after a limited period of time during which it is valid.

Figure 1C:
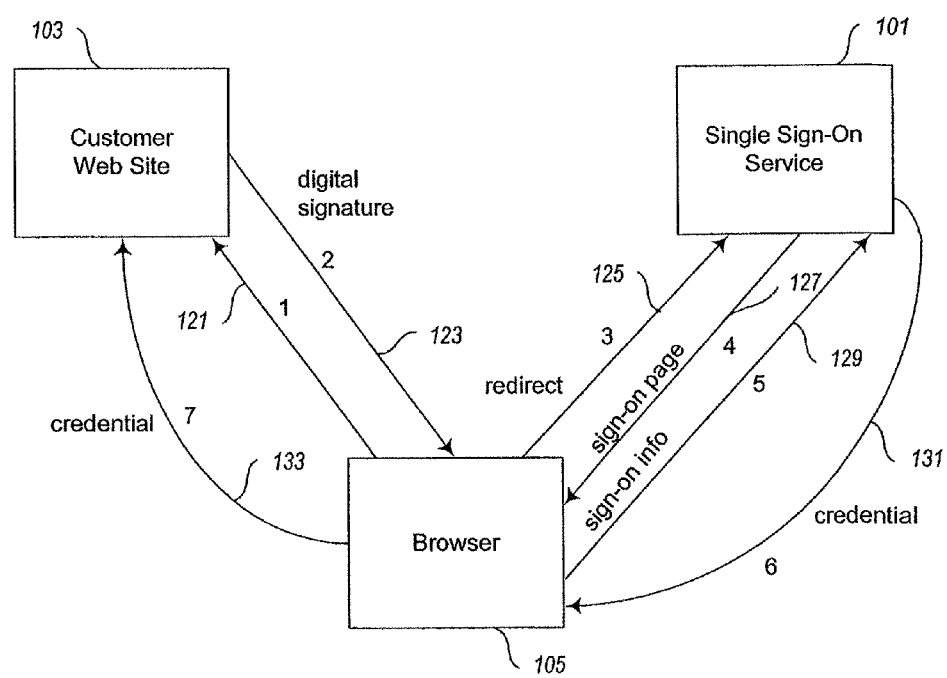

FIG. 1C illustrates one example of various types of interactions between a single sign-on Web service 101, an example customer Web site 103, and a Web browser 105 in use by an end-user (not shown) who is interacting with the customer Web site. In this example, as a first step in the illustrated interactions, the end-user uses the browser 105 to send a HTTP-based request 121 to the customer Web site 103 to obtain indicated functionality. The Web site determines that the requested functionality is available only to signed-on users, and accordingly sends a sign-on request 123 to the end-user to perform a sign-on process. In this illustrated embodiment, a digital signature is e attached to the sign-on request (e.g., using an X.509 certificate), as is generated in a manner described in greater detail elsewhere. In this example, the sign-on process is provided by the single sign-on service to numerous customer Web sites, and the sign-on request 123 is sent to the browser 105 in such a manner as to cause the browser 105 to forward the request 125 including the digital signature to the single sign-on service (e.g., by sending a redirect URL, such as via an HTTP 301 status code). The single sign-on service 101 then attempts to verify the digital signature of the request 125, as described in greater detail elsewhere, and if it succeeds it proceeds to send 127 a sign-on page back to the browser 105. The end-user then enters his/her sign-on information (e.g., username and password) in the sign-on page when displayed in the browser 105. The sign-on page may be generated based on information provided during a prior registration by the user with the single sign-on service to create a corresponding user account (or after an interactive registration process, not shown). The sign-on information is then transmitted back 129 to the single sign-on service (e.g., when the end-user selects a "Done" control or other similar control). In this example, the end-user trusts the single sign-on service provider, and is willing to send his/her sign-on information to the single sign-on service, especially since the sign-on information is not shared with the customer Web site 103 in this example. After receiving the sign-on information, the single sign-on service 101 determines whether the received sign-on information is valid, and if so performs the sign-on of the end-user and generates a credential that represents the user as a signed-on end-user. The generated credential is then sent 131 to the browser 105 in such a manner as to cause the credential to be forwarded 133 to the customer Web site 103, such as via a cookie for the customer Web site or via a redirect URL. After the customer Web site receives the credential that indicates the successful sign-on of the end-user, the customer Web site 103 provides the initially requested functionality (not shown) to the end-user. While not shown here, the customer Web site may also use the credential to take various subsequent actions on behalf of the end-user. For example, the credential may be returned to the single sign-on service along with a request related to an account of the user (e.g., to make payment based on financial information stored in the user account). Such credential-based use may be based on interactions directly between the customer Web site 103 and the single sign-on service 101, or instead via interactions with one or more affiliated intermediate services (not shown) and/or the end-user. In addition, at least some of the various messages may be advantageously transferred over HTTP/S for security reasons.

Figure 2B:
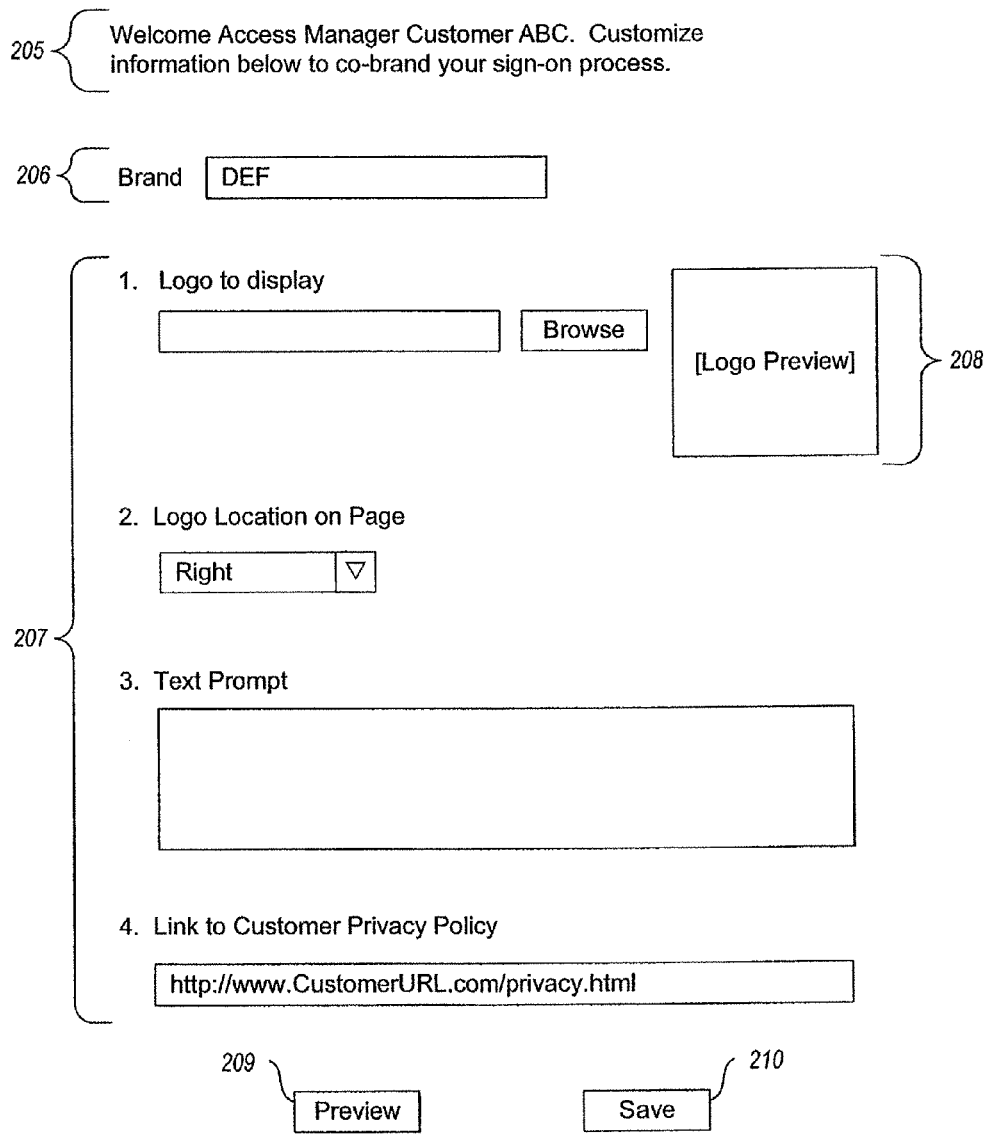

FIGS. 2A-2E illustrate examples of interactions between an access manager and a Web site or other service acting as a customer of the access manager in order to customize functionality to be provided to users of the customer service. In particular, FIG. 2A illustrates a first group of information that may be displayed to a representative of a prospective customer service of the access manager, such as via a Web page displayed to an operator of a service that is registering with the access manager in order to obtained customized functionality on behalf of users of the service. In this example, the initial registration information includes instructional information 201, and a section 202 in which the access manager customer can specify various types of information such as a name and Internet address 202a (e.g., a URL of a Web site that provides the service), administrative contact information 202b, and limited overview information about the service 202c. Various other types of information about the service and the operator of the service can be obtained in various ways in other embodiments, and may be used as part of a determination of a level of trust and corresponding permissions that the access manager will grant the access manager customer, such as to restrict the types of customizations that are made available to the customer. After the information is entered, the information is submitted to the access manager, in this example by clicking on the user-selectable "Register" control 203. Alternatively, the user-selectable "Reset" control 204 may instead be used to reset the information provided in the form. By selecting the "Register" control 203 the prospective customer will in this example be presented with a subsequent group of information (e.g., a next Web page) as shown in FIG. 2B to continue registration with the access manager. In other embodiments, all of the information requests and customization controls may instead be presented in other manners (e.g., as part of a single group of information that is displayed together).

FIG. 2B illustrates an example second group of information that may be displayed to a prospective customer service representative in order to specify one or more types of co-branding customizations. In this example, the available types of co-branding customizations are relatively minimal, such as to reflect a relatively low-level of permissions granted to the customer (e.g., as an initial default for any customer unless a higher level of trust can be verified, or based on information provided with respect to FIG. 2A and/or other information available about the service or service operator, such as based on past experience of interactions with the service or operator). In this example, the customer is allowed to specify multiple brands and to customize information differently for each brand. In other embodiments, such brands may not be used or instead each combination of a service and a brand may be treated as a distinct customer. Similarly, while not shown here, in other embodiments a customer may be able to specify other types of distinctions for which different co-branding or other customizations are specified and used, such as multiple geographic locales with which users may be associated or other groups of users. When specifying multiple brands, locales or other distinct groupings, each such grouping may in some embodiments be given a separate identifier and optionally a separate secret access key, such as to allow reference to a particular grouping to be used. In this example, the displayed information includes a section 206 to indicate a brand being configured (or to be left blank if distinct brands are not used or if the customizations are to apply to all brands), instructional information 205, and an area 207 with various questions and information selection/specification areas for the customer to specify one or more customizations. For example, the customer may specify one or more logo images of the service (e.g., by uploading corresponding files or specifying a network address from which the images may be retrieved) to be displayed to users, with a specified logo image preview 208 being shown in this example, as well as logo location to be used, text to be displayed to users, and a link to be displayed to users. As will be appreciated, a variety of other types of co-branding customizations may be made available in other embodiments. In addition, in this example the customer is provided a user-selectable "Preview" control 209 with which one or more sign-on pages or screens resulting from the specified co-branding customizations may be previewed, as well as a user-selectable "Save" control 210 to save the specified co-branding customizations. In this example, the customer is illustrated as performing only a single group of co-branding customizations, although in other embodiments multiple distinct sets of co-branding customizations may be specified. For example, multiple distinct sets of co-branding customizations may be provided for a single brand to reflect multiple pages or other groups of information to be displayed to users by the access manager (e.g., multiple pages used for the sign-on process and/or pages used for other related types of activities such as a sign-off or sign-out process, gathering information from users, presenting errors, refreshing credentials, generating a new credential for a secondary service based on a credential issued to a primary service (referred to as "cloning" the credential), etc.).

Figure 2C:
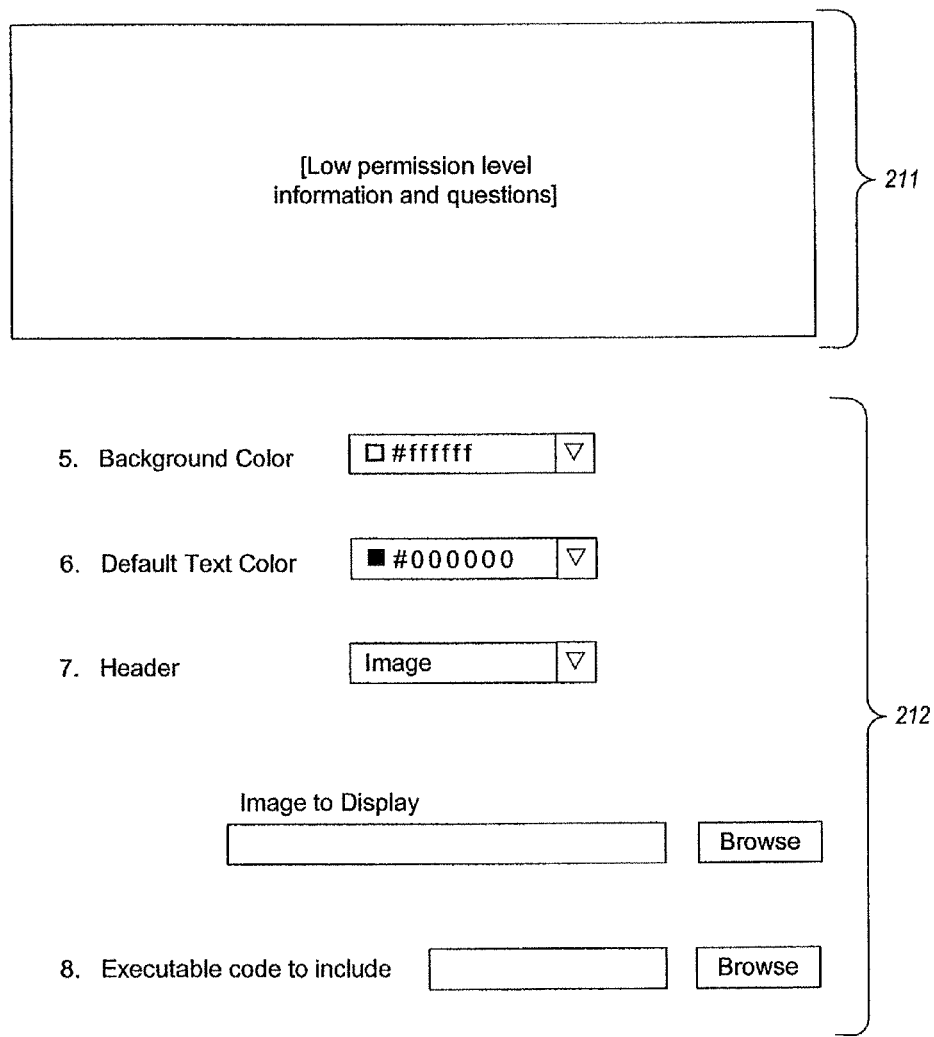

In a manner similar to that of FIG. 2B, FIG. 2C illustrates an alternative example second group of information that may be displayed to a prospective customer service representative in order to specify one or more types of co-branding customizations. In this example, additional types of co-branding customizations are available to the customer to reflect a relatively high-level of permissions granted to the customer (e.g., based on information provided with respect to FIG. 2A and/or other information available about the service or service operator). In other embodiments, additional types of co-branding customizations may be made available for other reasons (e.g., for premium customers, such as in exchange for additional fees). In this example, the displayed information includes indications 211 of the information 205-208 from FIG. 2B, and further includes additional co-branding customizations 212. The additional types of co-branding customizations in this example include the ability to further specify the appearance of information to be displayed to users, to specify user-selectable controls and/or other information to be included in a header of the page or other information displayed to users, and to specify other executable code to be included as part of the page or other information displayed or provided to users. These additional co-branding customizations types are merely illustrative, however, and other additional types of customizations may be available in alternative embodiments.

Although in this example an operator of or other representative of a customer service individually specifies various customizations in response to corresponding prompts, in other embodiments other techniques may be used to specify co-branding customizations. For example, a WYSWYG ("What You See is What You Get") system may be employed in some embodiments in which the customer graphically specifies an appearance of a customized sign-on page or other information to be displayed or otherwise presented to users, or instead co-branding customizations may instead be specified in a file using an appropriate format (e.g., XML or (X)HTML ("(eXtensible) HyperText Markup Language") fragments) and sent to the access manager.

FIG. 2D illustrates an example third group of information that may be displayed to a customer service representative in order to specify one or more types of information gathering to be performed when interacting with users of the service. In some embodiments, some or all of the types of information gathering may only be available to customers with a sufficiently high level of permission and/or based on other criteria (e.g., to be made available only to premium customers). In this example, various predefined types of information to gather are provided (e.g., each with corresponding questions to be displayed to users, not shown), with checkboxes 213 available to select one or more of the predefined information types. While not illustrated here, in at least some embodiments a customer service may further be able to configure one or more sets of customer-specified questions to be asked of the users, such as to type in the question to be asked and to optionally enumerate or otherwise indicate allowed answers to the question. In addition, the customer may further specify one or more types of user activities 215 for the access manager to track in this example, such as sign-on attempts (successful and/or non-successful), sign-off attempts, obtaining agreement to displayed or otherwise indicated terms and conditions (e.g., as specified by the customer during the registration process, not shown, and as accepted by a user via selection of an "Accept" control or via other indication of user assent). The customer may further specify the times to query users for predefined and/or customer-specified types of information in this example, as shown by user-selectable timing control 214, although in other embodiments the timing may instead be fixed (e.g., only once during a first sign-on (or other activity) by a user to a service, for each sign-on, etc.). Formatting information 216 may also be specified by the customer in this example, such as to indicate allowable types of answers for at least some of the predefined types of information to be gathered. In some embodiments, other types of information may also be supplied while configuring information gathering, such as logic for use in dynamically determining if user answers being supplied are permissible, logic for use in determining if some questions are to be asked of a particular user (e.g., questions about details regarding a spouse or child of a user, based on a prior answer from the user indicating whether the user has a spouse or a child), etc.

FIG. 2E illustrates an example fourth group of information that may be displayed to a customer service representative in order to specify one or more types of delegation of authority to other affiliated secondary services, such as to perform certain types of actions on behalf of users of the primary customer service, although in some embodiments such customizations may be provided to only customers with a sufficiently high level of permission (and the specific types of authority delegations may vary based on the permission levels and/or other factors). In this example, FIG. 2E has instructional information 217, and sections 219, 221 and 223 via which the customer can specify services to receive delegations of authority. While not illustrated here, the customer may further specify specific types of delegations of authority for each of the affiliated secondary services in some embodiments, such as by modifying a default set of authority delegations. The customer may further specify controls on information to which an affiliated service will have access (e.g., a specified subset of available user information). In this example, section 219 makes available various other services that are affiliated with the access manager (e.g., based on being provided by the same entity), such as a payment service (e.g., to enable payments to be made to and/or from a user's account) and a recommendation service (e.g., to obtain and/or provide recommendations on behalf of a user, such as in accordance with previously specified preferences for the user). In addition, section 221 makes available various other popular services (including in this example information about the service, such as a popularity or reliability rating), and section 223 allows the customer to specify other services.

In some embodiments, a secondary service affiliated with the primary customer service may itself need to be registered with the access manager in order to interact with the access manager on behalf of a user, and thus the popular services may be based on the services already registered with the access manager. Alternatively, if a specified service is not already registered with the access manager, the access manager may automatically query the specified service to offer the ability to register. When the customer service is interacting with a user, the delegation of authority to another service may occur in various ways, such as when initiated by the user (e.g., based on the user selecting a link or control displayed by the primary customer service that corresponds to capabilities provided via a secondary service, such as a link to make a payment from an account of the user that will be delegated to a payment service) and/or if performed automatically by the primary customer service. In addition, the interactions with the secondary service may in some embodiments be performed in a manner transparent to the user. For example, if payment-related capabilities are desired, a secondary affiliated payment service may generate and send a page or other group of information to the user, such as to obtain corresponding information from the user (e.g., an indication of one or more other parties, a verification of the user's sign-on or other information for at least some types of actions, etc.). In addition, in order to provide a consistent experience to the user, the secondary affiliated service may in at least some embodiments use previously specified co-branding information for the primary customer service in the information displayed to the user. To obtain access to such previously specified co-branding, the secondary affiliated service may interact with the access manager to obtain the co-branding information if authority to use that co-branding information has been delegated to the secondary affiliated service. For example, the primary customer service may delegate authority to the secondary affiliated service to be able to use specified types of co-branding information for the primary customer service (e.g., one or more logos or other images of the primary customer service) in a specified manner, and if so the secondary service may gain use of such co-branding information by sending an appropriate request to the access manager (e.g., a request that indicates the secondary service, the primary customer service, a type of information desired, and optionally specific co-branding information of the primary customer service). If the access manager determines that the secondary service is authorized to use that co-branding information, it will send back the co-branding information (or information that can be used by the secondary service to obtain the co-branding information).

Figure 3A:
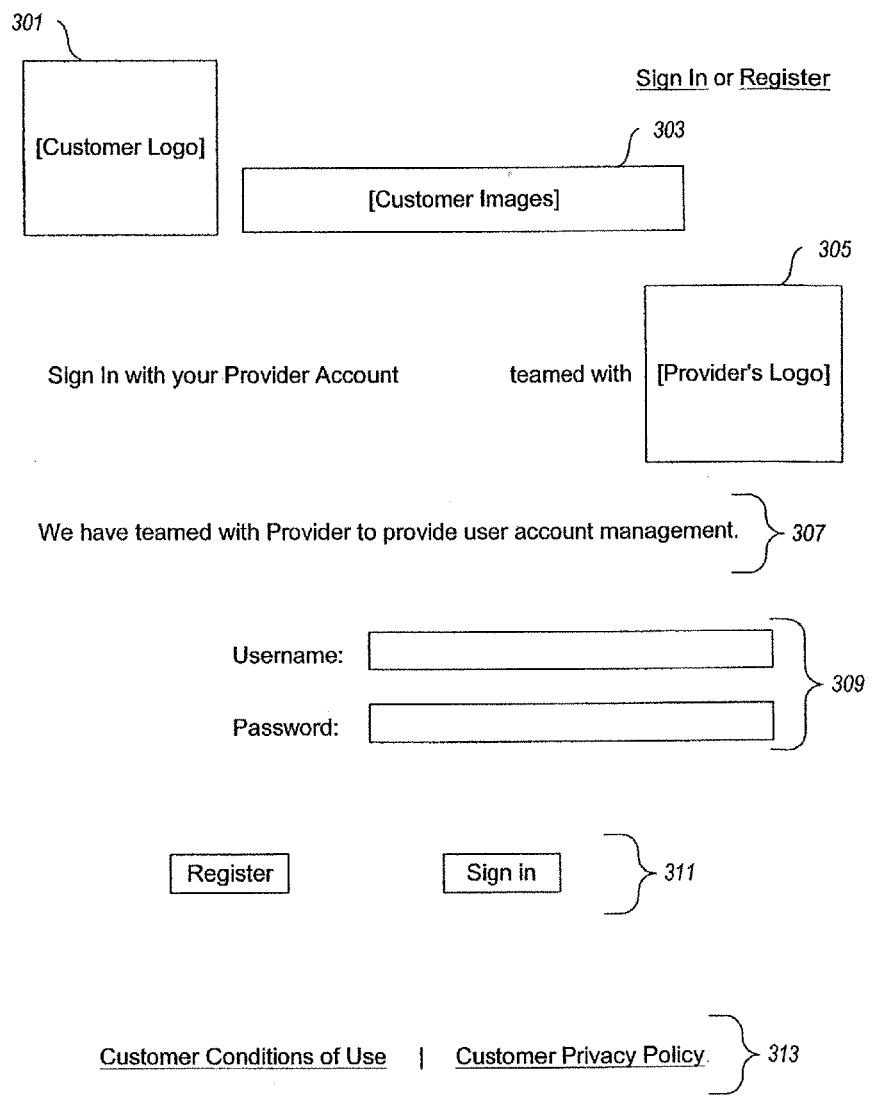

FIGS. 3A-3B illustrate examples of a customized sign-on process provided by the access manager to users on behalf of a customer service. In particular, FIG. 3A illustrates an initial sign-on page that is customized for a customer service to be displayed to a user of the service. In this example, the sign-on page may be generated by a provider of the access manager functionality for a customer with a relatively low level of permissions (or who has not selected to include customizations associated with higher levels of permission). A customer logo 301 and customer images 303 are displayed according to co-branding customizations in this example, and a logo 305 of the access manager or the entity providing the access manager is also shown. In other embodiments, the logo 305 may not be used. Instructional information 307 informs users to initiate the sign-on process using sign-on information for the account manager provider, such as based on accounts of the users with the access manager provider. The sign-on information may then be entered in the appropriate spaces 309 by a user. In addition, customized links 313 are displayed to provide access to the customer's conditions of use and the customer's privacy policy. Various user-selectable controls 311 to submit the sign-on information are also presented.

FIG. 3B illustrates a subsequent page for the sign-on process that is customized for a customer service to be displayed to at least some users of the service, such as users during their first sign-on to the customer service or for subsequent sign-on attempts that meet specified criteria. In particular, in this example the page is provided to perform customized types of information gathering by asking questions 325 specified by the customer. Such questions may include, but are not limited to, the shipping address, telephone number, and other contact information for the user. The customer logo 321 illustrates an example of various types of co-branding that may be present as part of the information gathering page, whether it is the same as logo 301 of FIG. 3A or instead a distinct logo of the customer. Instructional information 323 may also be presented to the user to inform him/her to answer the questions, whether by default or as specified by the customer service. Some questions may also illustrate customized data formats specified by the customer, such as for example telephone number 327. In some embodiments, client-side scripting (e.g., JavaScript) may be used to enforce any specified restrictions on allowable values, as well as to implement specified logic for determining if some of the questions should be asked to the user. Additional queries 329 may be asked of a user every time the user signs-on to the customer, even if other one-time information gathering is not being performed. After the user has answered the questions, the user can submit the information by using the user-selectable controls 331.

The sign-on and information gathering may be done in various manners in different embodiments. For example, although FIGS. 3A and 3B show Web pages, in some embodiments other interfaces may be utilized, including programmatically accessed interfaces. In addition, multiple pages may be used to gather information about a user, especially for the initial sign-on of a user to a customer, and various user interface widgets may be used in the user interface.

Although not illustrated here, the customized sign-on process and other types of customized user interactions may also be used in a variety of other situations and manners. For example, while the customizing techniques were illustrated in FIGS. 3A and 3B as being used as part of one or more Web pages, various other types of messages and information may instead be similarly customized, such as one or more email messages (e.g., email messages specified in HTML format) or other types of electronic messages sent to end-users. In addition, the techniques may be used to co-brand various other types of information provided to a user, such as search engine results or information provided by a social networking service.

Figure 4:
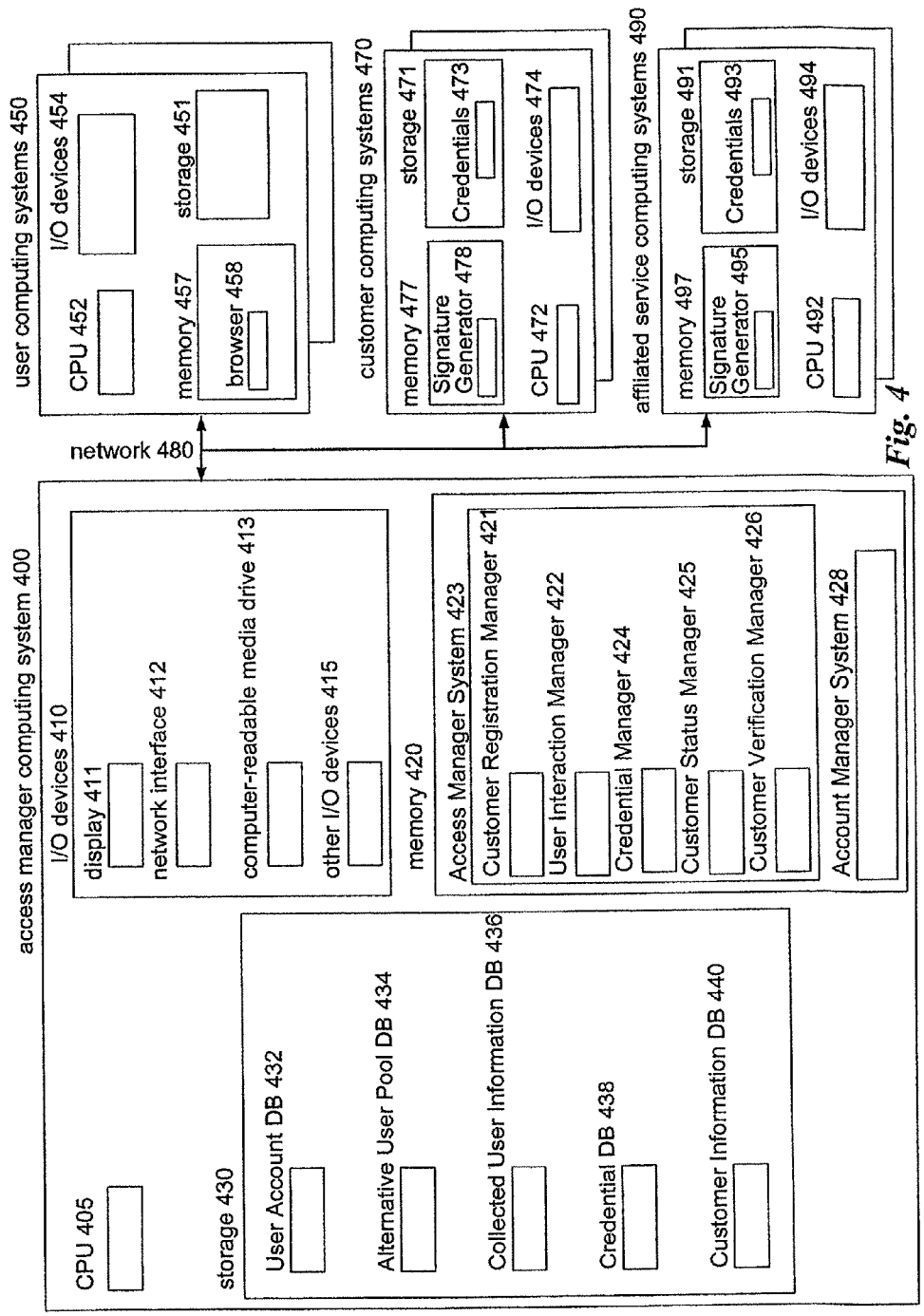
FIG. 4 is a block diagram illustrating an example embodiment of an access manager server computing system.

FIG. 4 is a block diagram illustrating an example embodiment of an access manager computing system 400, as well as various user computing systems 450, affiliated service computing systems 490 and customer service computing systems 470. In the illustrated embodiment, the access manager computing system includes a CPU 405, various I/O components 410, storage 430, and memory 420, with the I/O components including a display 411, a network interface 412, a computer-readable media drive 413, and other I/O devices 415.

Embodiments of the Access Manager system 423 and the Account Manager system 428 are executing in the memory 420, and they interact with other computing systems over the network 480 (e.g. via the Internet and/or the World Wide Web). Users may first interact with the Account Manager system in order to establish and use accounts (e.g., by each using a browser 458 executing in memory 457 of a user computing system), such as to specify sign-on information, contact information, financial information, etc. that is stored in a user account database 432 data structure on storage 430 in some embodiments, the Account Manager system and/or one or more other affiliated systems (not shown) may further provide a variety of types of functionality to users, such as online shopping functionality, messaging services functionality, information access functionality, etc. The illustrated embodiment of the Access Manager system 423 includes several manager components to provide various functionality, including a Customer Registration Manager component 421, a User. Interaction Manager component 422, a Credential Manager component 424, a Customer Status Manager component 425, and a Customer Verification Manager component 426, although in other embodiments the functionality of the manager components may instead be organized in other manners. The Customer Registration Manager component interacts with operators and other representatives of services to register those services as customers of the Access Manager system and to customize sign-on and other functionality to be provided to users of the services, with the customer-provided information being stored in a customer information database 440 data structure on storage. After a prospective customer service has registered as a customer, one or more users may interact with services and other functionality provided by customer service computing systems, and be directed to the Access Manager system to perform a sign-on to the customer service. The User Interaction Manager component will then interact with the user so as to provide a customized sign-on process for the customer service, such as based on previous stored user account information and/or based on registering the user as a new user for the Account Manager system (whether directly or by re-directing the user to interact with the Account Manager system). In addition, in some embodiments the User Interaction Manager component will gather various information for the user in a customized manner, and will store the information in the collected user information database 436 data structure. If the sign-on attempt is successful, the Credential Manager component will generate a credential representing the user, store the credential information in the credential database 438 data structure on storage, and return the credential to the customer service (e.g., via a response to the user that is re-directed back to the customer service) for storage as a credential 473 on storage 471 of a computing system of the customer service, as well as to optionally provide any information gathered for the user.

A customer service may then interact with the Account Manager and/or Access Manager systems in order to perform various actions on behalf of the user (e.g., to modify and/or use account information of the user), such as by providing the credential representing the user. Under some circumstances, a user may be directed by a customer service to an affiliated service provided by an affiliated service computing system, with a credential issued to the customer service for the user being provided to the affiliated service and stored with credentials 493 on storage 491 of the affiliated service computing system. The user may then optionally be similarly redirected by the affiliated service to interact with the Access Manager system and/or Account Manager system in order to perform actions on behalf of the user. Customer services (or their representatives) may also interact with the Customer Status Manager component to obtain various information about the service, including information about the service's own customer account with the Access Manager system, and gathered user information from the collected user information database. In addition, in at least some embodiments some customer services may each request that the Access Manager system and Account Manager system provide additional customized functionality to track and provide a variety of types of information about actions of users of the customer service, such as to make available to the customer service most or all of the user-related information that the customer service would have if it implemented its own sign-on service. If so, such user information is stored in an alternative user pool database 434 data structure and is made available to those customer services by the Customer Status Manager component, while similar detailed information about other users (or the same users when interacting with other services) is not made available to those customer services in the illustrated embodiment.

In at least some embodiments, a Customer Verification Manager component is used to provide various additional security measures regarding interactions of customer services with the Access Manager system and/or Account Manager system. In particular, in such embodiments at least some messages from customer services must include digital signatures that are generated based on information in the message and using a secret access key known to the service and to the Customer Verification Manager component (e.g., a secret access key determined during initial registration of the service and stored in the service information database 440)—such digital signatures are generated by a customer service in the illustrated embodiment via a Signature Generator component 478 executing in memory 477 of the computing system 470 of the customer service using a secret access key (not shown) of the customer service. If so, the Customer Verification Manager component verifies the included digital signature (e.g., by replicating it by generating a new matching digital signature using the secret access key for the customer that is known to the component) in order to authenticate the received message before other of the systems or components respond to the message. Such authentication of messages may further be performed for at least some affiliated services in at least some embodiments and circumstances. Furthermore, in some embodiments other types of messages may be similarly digitally signed using a secret access key of one or more related services and authenticated based on the digital signatures. For example, these messages include messages from the Access Manager system and/or Account Manager system to a customer service or affiliated service that are authenticated by the recipient service, messages between customer services and affiliated services that are authenticated with the assistance of the Customer Verification Manager component (unless the services have access to the secret access keys of the other services), etc.

It will be appreciated that the illustrated computing systems are merely illustrative and are not intended to limit the scope of the present invention. Access manager computing system 400 may be connected to other devices that are not illustrated, including through one or more networks such as the Internet or the Web. More generally, the various computing systems may each comprise any combination of hardware and software that can interact in the manners described, including computers, network devices, internet appliances, PDAs ("Personal Digital Assistants"), wireless phones, pagers, electronic organizers, television-based systems and other various consumer products that include inter-communication capabilities. In addition, the functionality provided by the access manager system components illustrated in FIG. 4 may in some embodiments be combined in fewer components or distributed in additional components. Similarly, in some embodiments the functionalities of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components may execute in memory on another device and communicate with an illustrated computing system or device via inter-computer communication. Some or all of the access manager system components or data structures may also be stored (e.g., as instructions or structured data) on a computer-readable medium, such as a hard disk, a memory, a network, or a portable article to be read by an appropriate drive. The access manager components and data structures can also be transmitted as generated data signals (e.g. as part of a carrier wave) on a variety of computer-readable transmission mediums, including wireless-based and wired/cable-based mediums. Accordingly, the present invention may be practiced with other computer system configurations.

Figure 5:
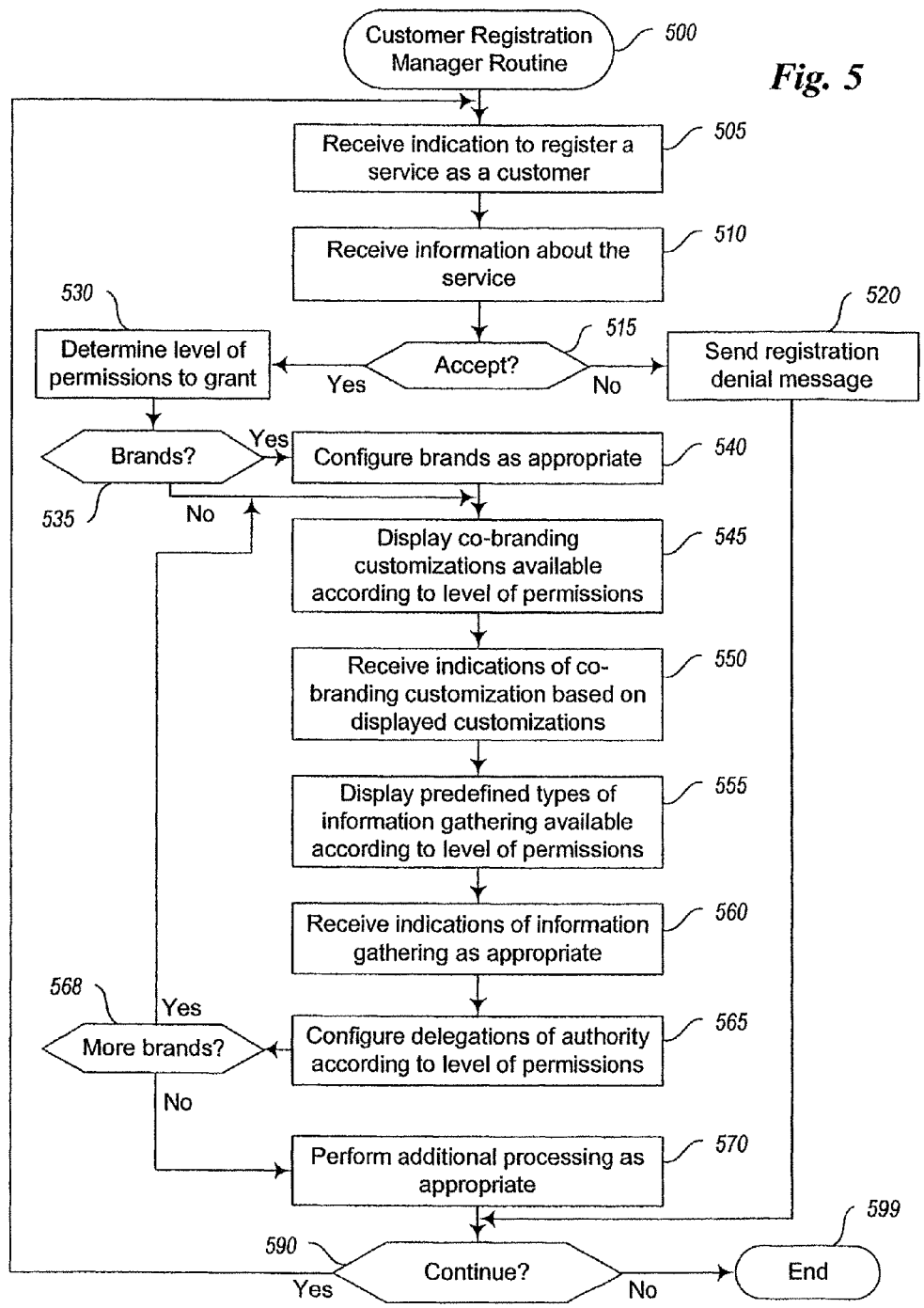
FIG. 5 is a flow diagram of an example embodiment of a Customer Registration Manager routine.

FIG. 5 is a flow diagram of an example embodiment of the Customer Registration Manager routine 500. The routine may, for example, be provided by execution of the Customer Registration Manager component 421 of FIG. 4, such as to interact with operators and other representatives of services to customize sign-on and other functionality to be provided to users of the services.

The routine begins at step 505, where an indication is received from an operator or other representative of a service to register the service as a customer with the access manager. After step 505, the routine receives information in step 510 about the service (e.g., a service provided by or as part of a Web site), such as in an interactive manner by displaying a page asking for the information (e.g., as illustrated in FIG. 2A) or instead as part of a programmatically accessed API. After the information is received at step 510, the routine determines whether or not to accept the customer, such as based on whether the service and/or operator are determined to be sufficiently trustworthy (e.g., using the information obtained in step 510) and/or based on other criteria. If the customer is not accepted, the routine proceeds to step 520 to send a registration denial message, and then continues to step 590. Otherwise, at step 530 the routine determines a level of permissions to grant the customer, such as based on a degree of trust assessed for the service and/or the operator, and optionally based on factors such as any liability of the access manager resulting from actions of the service (e.g., based on a type of the service, a number of users of the service, the types of co-branding and/or other customizations that the customer is enabled to use, such as if a customer is allowed to specify and use executable code, etc.), any past experience between the access manager and the customer, etc. In addition, in some embodiments a customer may be charged more money to receive a higher level of permissions (e.g., as part of a premium service) and thus gain additional functionality. The increased charges may be based at least in part on the customer's ability to and/or likelihood of exposing the access manager to liability, such as by exposing confidential or sensitive user information to unauthorized users, by allowing unauthorized users to conduct financial transactions or otherwise perform operations on behalf of users, etc. In at least some embodiments, the level of permissions for a customer may be reviewed and changed at later times. After the level of permissions has been determined in step 530, depending on the permissions granted, the routine determines whether to allow the customer to configure any brands and if so whether the customer has any such brands. If so, the routine proceeds to step 540 where brands are configured as appropriate.

Otherwise, or after step 540, the routine proceeds to step 545 where co-branding customization types that are available to the customer according to the determined level of permissions are displayed, such as for a first of the brands and/or for all brands (if brands were configured in step 540). In some embodiments, the display may be a Web page, and may include a user interface similar to that of FIGS. 2B and/or 2C. After displaying the co-branding customization types available, one or more indications of co-branding customizations are optionally received by the routine at step 550 and stored for later use. In some embodiments, if multiple pages or other groups of information may be co-branded, each page may be separately configured. In step 555, predefined types of information gathering that are available to the customer according to the determined level of permissions are displayed, and one or more indications of information gathering customizations are optionally received in step 560 and stored for later use. In step 565, predefined types of authority delegation that are available to the customer according to the determined level of permissions are displayed, and one or more indications of authority delegation customizations are optionally received and stored for later use. In step 568, if multiple brands were configured and are being customized individually, the routine returns to step 545 to initiate configuration for the next brand, and if not the routine proceeds to step 570 to perform additional processing if appropriate (e.g., storing various information in appropriate datastores, generating and providing to the customer a unique identifier and a secret access key, etc.). The routine then proceeds to step 590 to determine whether to continue. If so, the routine returns to step 505, and if not the routine ends at step 599.

The illustrated routine may be performed in other ways in alternative embodiments. For example, although the routine shows that each brand may be configured for multiple types of customizations, in some embodiments brands may only be able to have individually configured co-branding customizations. In other embodiments, the customizations may be specified in a different order, and if the access manager customer does not have permission for configuring a particular type of customization, the steps related to that type of customization may be skipped. For example, if a customer does not have permission to gather information from the user, the routine may skip from step 550 to 565. While not illustrated here, in some embodiments the routine could additionally use various other security information and/or mechanisms, such as to verify the identity of the customer's representative.

Figure 6:
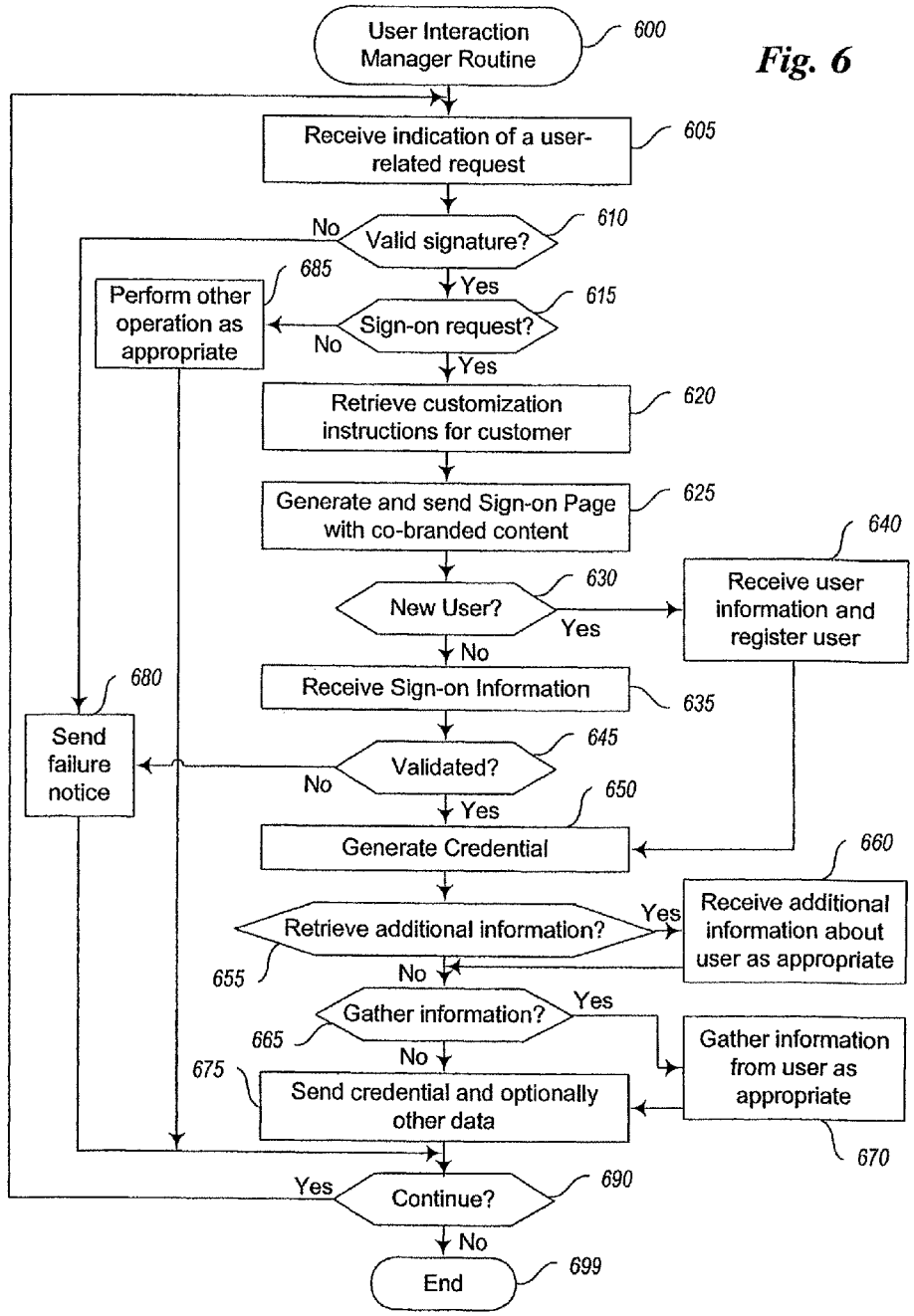
FIG. 6 is a flow diagram of an example embodiment of a User Interaction Manager routine.

FIG. 6 is a flow diagram of an example embodiment of a User Interaction Manager routine 600. The routine may, for example, be provided by execution of the User Interaction Manager component 422 of FIG. 4, such as to interact with a user on behalf of a customer service so as to provide a customized sign-on process specified by the customer service.

In step 605, the routine receives an indication of a request regarding a user on behalf of a customer service, such as for the user to sign-on for the service. In the illustrated embodiment, the request includes a customer identifier associated with the customer and a digital signature for the request that is generated in a manner specific to the customer. The digital signature attached to the request is then checked by the Customer Verification Manager routine (as illustrated in FIG. 9B), and if it is determined in step 610 to not be valid, the routine continues to step 680 to send a failure notice and then continues to step 690. If the signature is valid, the routine instead continues to step 615 to determine the type of the request If the request is for something other than sign-on, the requested operation is performed as appropriate in step 685. If the request is a sign-on request, the previously configured customizations for the customer associated with the received customer identifier are retrieved in step 620, and in step 625 a sign-on page is generated with the customized co-branded content and sent to the user. Then, at step 630, the routine determines if the user has an account with the access manager, and if not, the routine obtains information about the user and registers the user with the access manager in step 640. If the user already has an account with the access manager provider, then sign-on information is received from the user at step 635, and in step 645 it is determined whether the sign-on information is valid (e.g., matches the stored sign-on information for the user). If the sign-on information is not valid, then the routine continues to step 680 to send a failure notice to the user.

If the sign-on information is valid, or after step 640, then at step 650 a credential or other indication of the valid sign-on of the user is generated to be provided to the service (or in other embodiments to be provided to the user for use with one or more services, such as for a specified period of time or according to other indicated criteria). The routine then determines in step 655 whether to retrieve additional information about the user to be provided to the service (e.g., a username, unique identifier, actual name, etc.), such as based on prior customizations and current circumstances, and if so continues to step 660 to retrieve the additional information as appropriate. In some embodiments, the ability of a customer service to obtain this additional information may be restricted by the level of permissions granted to the customer. After step 660, or if no additional information was retrieved, the routine then determines at step 665 whether any information is to be gathered about the user, such as based on prior customizations and current circumstances, and if so continues to step 670 to gather the information about the user as appropriate. After step 670, or if no information was gathered, the credential and optionally other data (e.g., the retrieved and/or gathered information) is sent to the customer, such as via the user using HTTP redirect functionality. After steps 675, 680 or 685, the routine determines whether to continue in step 690. If so, the routine returns to step 605, and if not ends at step 699.

Figure 7:
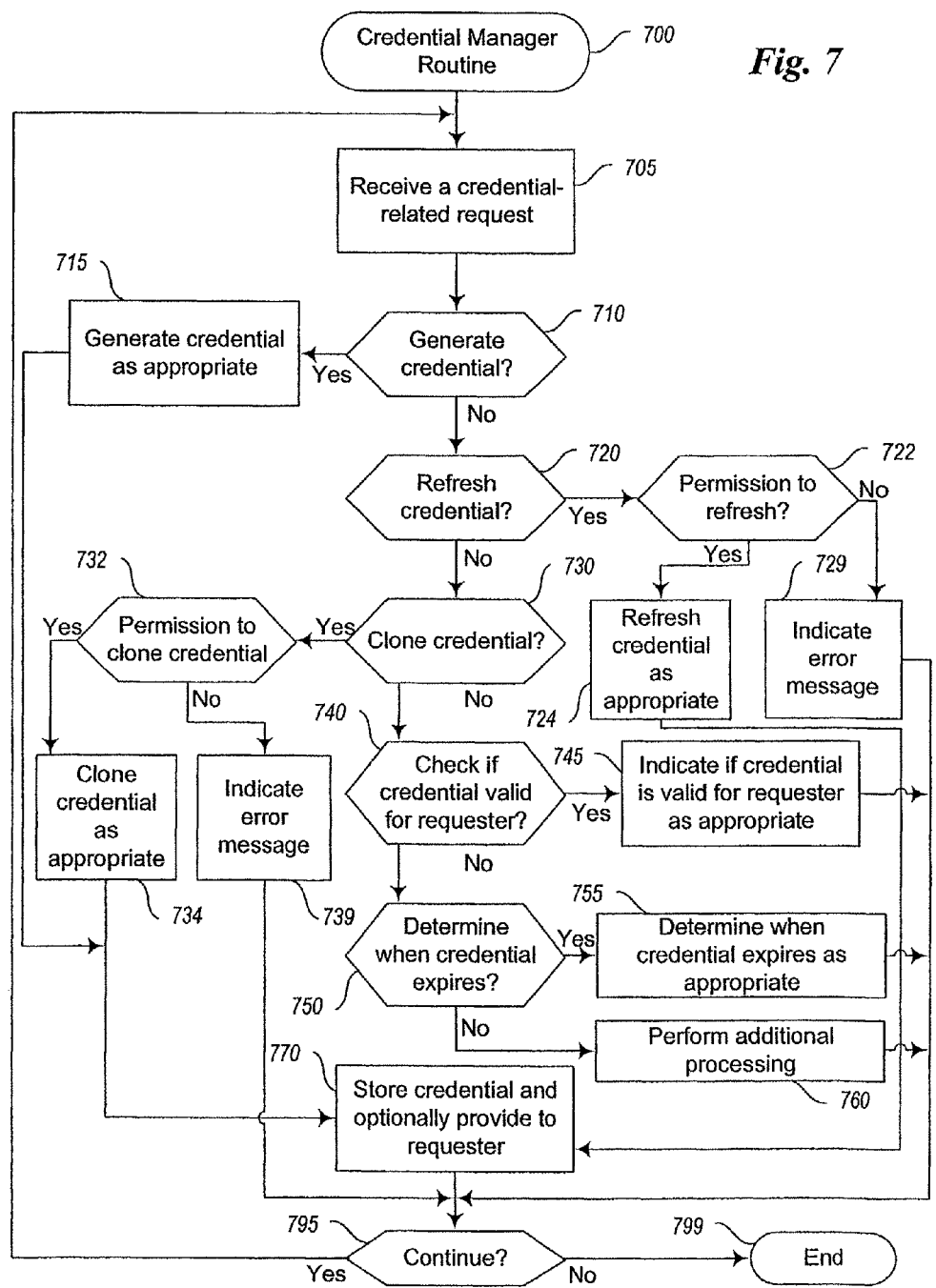
FIG. 7 is a flow diagram of an example embodiment of a Credential Manager routine.

FIG. 7 is a flow diagram of an example embodiment of a Credential Manager routine 700. The routine may, for example, be provided by execution of the Credential Manager component 424 of FIG. 4, such as to generate credentials representing users and to perform other credential-related activities.

The routine begins at step 705 where a credential-related request is received, such as from an external service or another access manager component—depending on the request, the request may also contain additional parameters, including an existing credential on which to perform the request. After the request is received, the routine proceeds to step 710 where it is determined if the received request is to generate a new credential to represent a user for a service, such as from the User Interaction Manager component. If so, the credential is created as appropriate in step 715 (such as by mapping a unique random number to the user, or retrieving information about the user for inclusion as part of the credential), and the routine continues to step 770 to store the credential and optionally provide in to the requester. If the request was not to generate a credential, then the routine determines in step 720 if the request is to refresh an existing credential to extend its period of validity, such as from a service to which the credential was initially issued. If so, the routine determines in step 722 whether the requester has permission to refresh the credential (e.g., based on a level of permission granted to the requester and/or information specified by the user represented by the credential, such as during the sign-on to the service). If permission exists, then the credential is refreshed in step 724 before the routine continues to step 770. If there is not enough permission to refresh the user credential, then an error message is indicated at step 729 and the routine proceeds to step 795.

If it is determined in step 720 that the request is not to refresh the credential, the routine proceeds to step 730 to determine if the request is to clone an existing credential, such as a request from a secondary affiliate service to obtain use of a credential for a user that was issued to a primary customer service with which the secondary service is affiliated. If so, the routine continues to step 732 to determine whether the credential cloning is authorized, such as based on authority delegated to the secondary service from a primary service. In addition, in some embodiments the cloning of a credential representing a user may involve requesting the user to provide information and to optionally approve or otherwise acknowledge the cloning, and in such embodiments the determination of whether the cloning is authorized may further be based at least in part on the user actions. If it is determined in step 732 that permission exists, then in step 734 the credential is cloned and the routine continues to step 770, and if not then at step 739 an indication is sent that an error occurred and the routine proceeds to step 795.

If it is determined in step 730 that the request is not to clone a credential, then the routine proceeds to step 740 to determine if the request is to verify whether a credential is valid. If so, then the routine determines in step 745 if the credential is currently valid for the requestor and optionally for an indicated action, and sends an indication of the credential's validity to the requester. If the request is not to determine if a credential is valid, then at step 750 the routine determines if the request is to determine when the credential will expire. If so, then at step 755 the routine determines the expiration and indicates it to the requester, and if not the routine continues to step 760 to respond to other types of requests as appropriate. After steps 729, 739, 745, 755, 760 or 770, the routine determines at step 795 whether to continue. If so, the routine returns to step 705, and if not ends at step 799.

Figure 8:
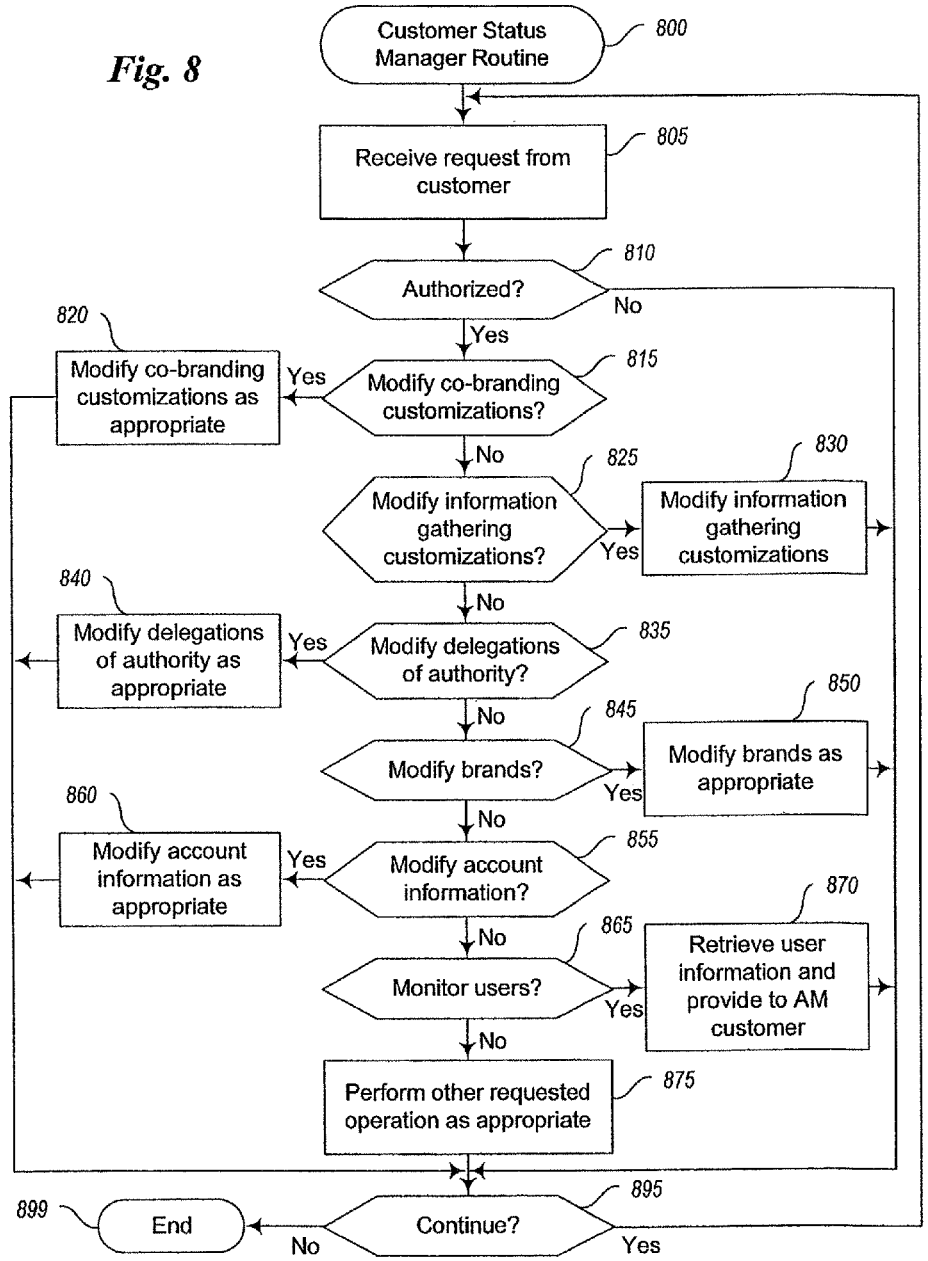
FIG. 8 is a flow diagram of an example embodiment of a Customer Status Manager routine.

FIG. 8 is a flow diagram of an example embodiment of a Customer Status Manager routine 800. The routine may, for example, be provided by execution of the Customer Status Manager component 425 of FIG. 4, such as to provide various types of information to customers.

The routine begins at step 805, where a request is received from a customer. In step 810, the routine determines if the request is authorized, such as by interacting with the Customer Verification Manager component and/or based on the level of permissions granted to the customer. If not, the routine proceeds to step 895, but otherwise determines in steps 815-860 whether the customer has requested to modify various types of information and if so performs the modifications as appropriate. Types of information that may be modified by the customer in the illustrated embodiment include co-branding customizations (in steps 815 and 820), information gathering customizations (in steps 825 and 830), authority delegation customizations (in steps 835 and 840), brands (in steps 845 and 850), and customer account information (in steps 855 and 860). If the received request is not to modify information, the routine determines in step 865 if the request is to monitor users. If so, previously tracked user information is retrieved in step 870 and provided to the customer, and if not the routine continues to step 875 to perform other requested functionality as appropriate. After steps 820, 830, 840, 850, 860, 870 and 875, or if it was determined in step 810 that the request was not authorized, the routine continues to step 895 to determine whether to continue. If so, the routine returns to step 805, and if not ends at step 899.

Figure 9A:
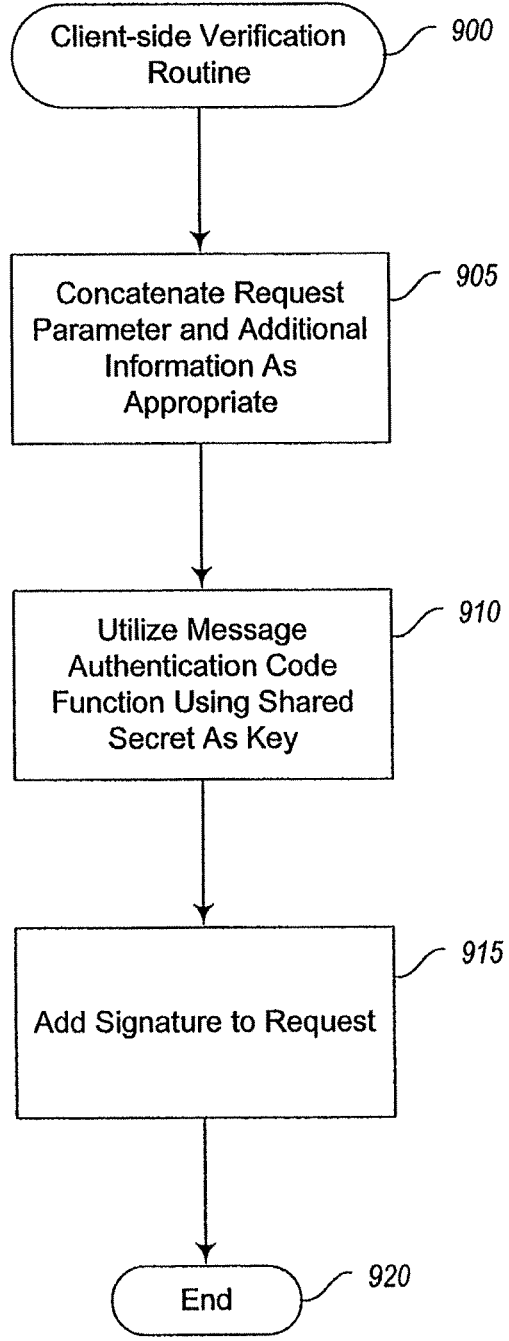
FIGS. 9A and 9B are flow diagrams of example embodiments of routines for authenticating received messages.
Figure 9B:
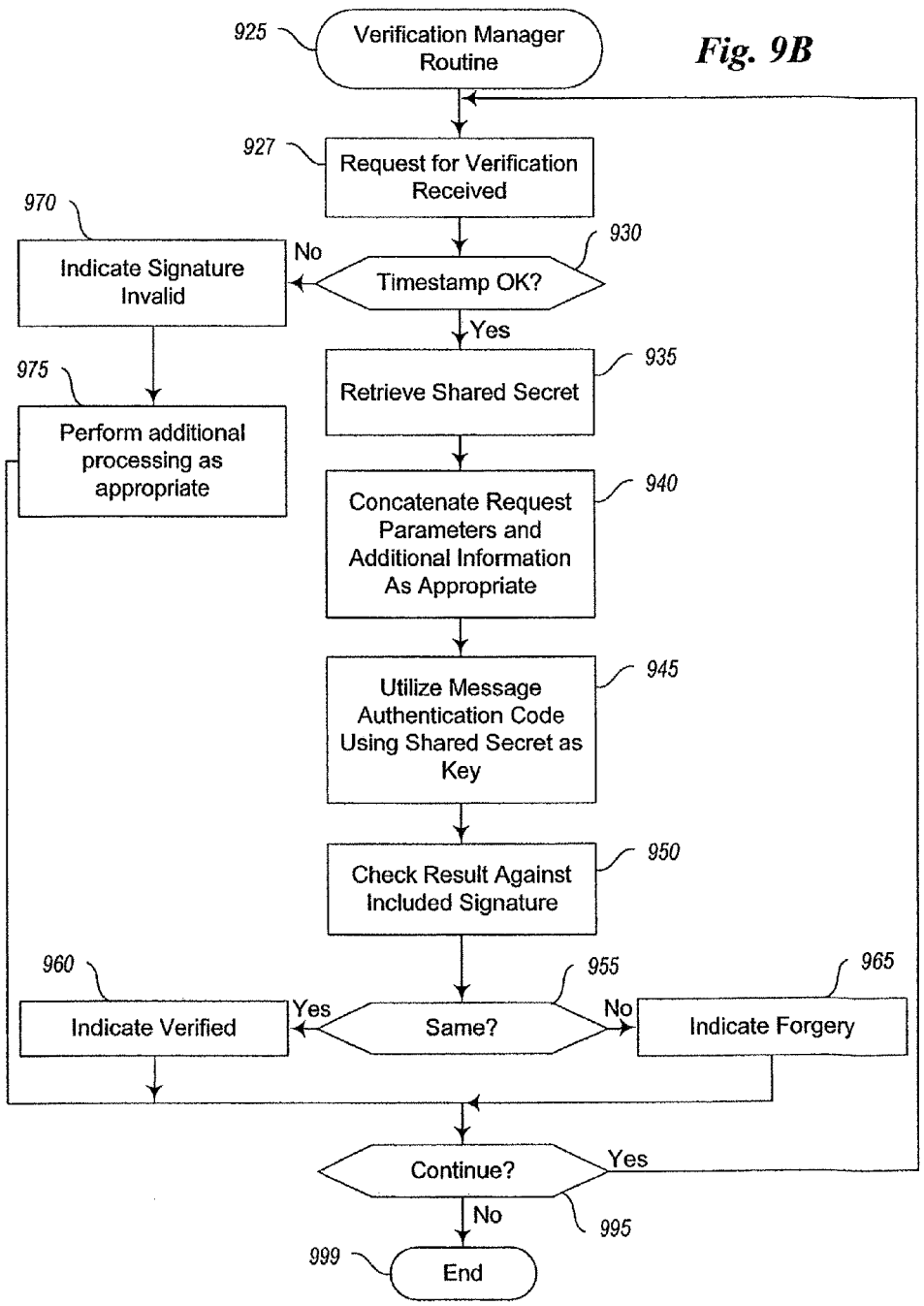

FIGS. 9A and 9B are flow diagrams of an example embodiment of routines for authenticating received messages, with FIG. 9B illustrating an example embodiment of a Verification Manager routine 925 and with FIG. 9A illustrating an example embodiment of a corresponding Client-Side Verification routine 900. The Verification Manager routine may, for example, be provided by execution of the Customer Verification Manager component 426 of FIG. 4, such as to provide various additional security measures regarding incoming messages from customer services and other services. The Client-Side Verification routine may, for example, be provided by a computing system of a customer service in conjunction with the Signature Generator component 478 of FIG. 4, such as to use additional security measures for outgoing messages to the access manager.

The client-side routine 900 of FIG. 9A begins at step 905, where an indication to generate an outgoing message from a customer service that is to include various information is received, and in which various information is gathered for use in generating a customer-specific digital signature to accompany the message for security purposes. In some embodiments, information used in generating the signature includes at least some of the content of the message, as well as other information that is not included such as a secret access key. In addition, in some embodiments other information may be added to the information used in generating the signature, such as a current timestamp (e.g., to prevent the message from later being reused if intercepted). The messages to be sent may have various forms, including an HTTP request sent using a URL or other URI ("Uniform Resource Identifier") in which the message contents are included as part of one or more query string parameter values and in which the digital signature will be included as a value of another query string parameter. In step 910, the routine generates a digital signature based on the gathered information, such as by using a previously selected digital signature algorithm and using previously selected types of message information (e.g., particular message parameter values in a particular order). In step 915, the signature is added to the message before it is sent out, and the routine then ends at step 920 until a next signed message is to be sent.

The Verification Manager routine 925 of FIG. 9B begins at step 927, where a request for verification of an incoming message is received, such as a request received from access manager system or one of its components regarding a message received from a customer service or an affiliated service. At step 930, the routine first determines if the message is sufficiently recent, such as based on whether time elapsed from a timestamp attached to the message exceeds a predetermined period of time. If the timestamp is too old, the routine sends an indication in step 970 that the signature is invalid, and additional processing as appropriate is optionally performed in step 975 (e.g., generating a notification if a pattern of invalid messages is seen). Then, the routine proceeds to step 995.

If the timestamp was sufficiently recent, then the routine proceeds to step 935 to retrieve the stored secret access key for the customer from whom the message was received, such as based on an identifier assigned to the customer that is included in the message and associated with the secret access key. In other embodiments, the customer or other affiliated service may be identified in other ways such as based on the IP address from which the request is received. After retrieving the secret access key and any additional information about the customer in step 935, the routine generates a digital signature for the message at steps 940 and 945 in the same manner as that described previously with respect to steps 905 and 910 of FIG. 9A, such as to use information included in the message (not including the digital signature) and the retrieved secret access key. In step 950, the newly generated signature is then checked against the signature included in the message. If the two digital signatures are determined in step 955 to be the same, the message is verified and a corresponding confirmation is sent in step 960. If the message is not verified, it is considered a forgery and a corresponding indication is sent in step 965. After steps 960, 965 or 975, the routine proceeds to step 995 where it determines whether to continue. If so, then the routine returns to step 927, and if not ends at step 999.

While not illustrated here, in some embodiments similar techniques may be used by services to verify messages from the access manager. In addition, various embodiments may have additional security features and mechanisms beyond the signature-based verification illustrated in FIGS. 9A and 9B, such as to gather information regarding the identity of a representative of a service when the representative is initially registering the service.

Thus, various techniques may be used to provide customizable sign-on and other functionality to services, as well as to use various techniques to enhance security of interactions. In addition, in some embodiments a variety of additional information and techniques may be used. For example, customers of the access manager customers may include Web sites (such as ecommerce sites) and may be unrelated to the provider of the access manager. The level of permissions granted to a customer by the access manager may also vary, such as to grant a higher level of permissions to well-known respected sites than to unknown sites. In addition, a low level of co-branding permissions may only allow an access manager customer to specify images and text to be used, while an access manager customer with higher-level permissions may be able to add images, image maps (to provide functionality when a user selects any part of or a designated portion of the image), specified types of user-selectable functionality (e.g., a header with dropdown buttons), text, links, background music, JavaScript code, Flash animations, Shockwave movies, Java applets, custom CSS ("Cascading Style Sheets") styles, etc. In some embodiments, the granting of permissions happens automatically in a realtime or near-realtime process, while in other embodiments the process may take longer (e.g., to allow for manual review of the service). In addition, in some embodiments the level of permissions granted to a customer may be reviewed and modified, such as on a periodic basis. For example, if problems or concerns with a customer have arisen, the level of permissions may be decreased. Conversely, the level of permissions may be increased if no such problems have occurred, such as to grant some or all new customers low levels of permission that are gradually increased if warranted by continued experience with the customer. For example, permissions may be increased based on an analysis or review of traffic and/or usage patterns by or on behalf of the customer. In some embodiments, reviews of the level of permissions granted may be triggered by external factors, such as news about or changes to the customer (e.g., a merger or buyout of a customer, bankruptcy, etc.).

A variety of types of services may be used as affiliated services, including (but not limited to) payment processors, credit card verification services, consumer survey services, advertising services, fulfillment services, etc., and in some embodiments the provider of the access manager may offer some of its services as affiliated services. Affiliated services may in some cases be provided access to a subset of the information for a customer or a user to facilitate providing their services—for example, a consumer survey service may want to know when a particular product shipped to a consumer as well as contact information in order to perform follow-up with the consumer about the product and service.

A message or other request sent from a service to the access manager may take a variety of forms in various embodiments. In some embodiments, a request may be an HTTP message with message parameters or other contents passed as a query string, and at least some information (e.g., secret access keys, confidential user sign-on information and other user information, etc.) is preferably sent by secure means (e.g., secure HTTP) or in an offline manner (e.g., via physical mail, telephone, etc.). Similarly, a user's sign-on information or other identifying information may have various forms, such as a username and password, various biometric information, PKI-based information, etc. In some embodiments, credentials may be exchanged as Web browser cookies, or alternatively in a format specified by the WS-Federation Passive Profile (e.g., a WS-Trust RequestSecurityTokenResponse XML element) or based on another sign-on specification standard (e.g., based on the Liberty Alliance Project, on Microsoft's Passport service, etc.). Similarly, in some embodiments a sign-on process may be performed in various ways, such as via the process specified in WS-Federation Passive Requestor Profile.

As previously noted, in some embodiments at least some customer services may request the establishment and use of an alternative data pool for users of the service, such as to track a variety of types of interactions with the users. For example, alternative data pools may store information about users such as purchases, products or services viewed, login times, information modifications that are made, and possibly information about historical or other activities of the users that are not specific to the customer service, and in some embodiments a customer may be allowed to configure what data to store in the alternative data pool. In some embodiments, the availability of an alternative data pool to a customer may be dependent on the level of permissions granted to the customer.

In some embodiments, secret access keys may be modified or re-generated, such as periodically or if compromised. In addition, additional security may be obtained by maintaining information about how to use the secret access key available only to appropriate recipients, and moreover to optionally using different processes for different customers. In some embodiments, an indicated process may include a list of parameters whose values for a message are to be included, an ordering of the message parameters, and a type of encoding to use, and a process may be indicated to a customer in various manners (e.g., documentation for use by a service operator in manually incorporating the process into the service, executable code to be given various input so as to perform the process, etc.). A digital signature may be generated in various ways, such as by using a message authentication code (e.g., HMAC ("keyed-Hash Message Authentication Code") with MD5 ("Message Digest algorithm 5")).

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable medium having stored contents that configure a computing device of a sign-on service to perform a method, the method comprising:

registering, by the sign-on service, a client site with the sign-on service to enable users interacting with the client site to perform sign-on activities via the sign-on service, the registering including storing a copy at the sign-on service of secret information associated with the client site;

registering, by the sign-on service, a first user with the sign-on service by storing sign-on information at the sign-on service for the first user;

receiving, by the sign-on service and after the registering of the client site and of the first user, an electronic request sent by the client site to cause a sign-on to the sign-on service of the first user based on interactions of the first user with the client site, the received request including the sign-on information for the first user and further including a digital signature that is generated by the client site based on first information that is included in the request and on the secret information associated with the client site, wherein the secret information is not included in the request;

verifying, by the sign-on service, that a sender of the request is actually the client site registered with the sign-on service based at least in part on the secret information used in generating the digital signature matching the stored copy at the sign-on service of the secret information associated with the client site;

determining, by the sign-on service, that the sign-on information for the first user included in the request is valid by matching the included sign-on information with the stored sign-on information for the first user;

performing, by the sign-on service based on the verifying and on the determining that the sign-on information is valid, a sign-on of the first user to the sign-on service;

generating, by the sign-on service, a credential to represent the first user in future interactions between the sign-on service and the client site by retrieving previously stored information specific to the first user to include in the credential, and providing the credential from the sign-on service to the client site;

receiving, by the sign-on service after the providing of the credential to the client site, a second electronic request from the client site that includes the credential and that is to obtain indicated functionality for the first user; and initiating, by the sign-on service and based at least in part on the credential included in the second electronic request, providing the indicated functionality for the first user.

2. The non-transitory computer-readable medium of claim 1 wherein the verifying that the sender of the request is actually the client site registered with the sign-on service includes generating a new digital signature and determining that the new digital signature matches the digital signature included in the request, the generating of the new digital signature being based on the first information included in the request and on the stored copy of the sign-on service for the secret information.

3. The non-transitory computer-readable medium of claim 1 wherein the method further comprises verifying that the second electronic request is authorized, the verifying of the second electronic request including verifying that the client site is authorized to obtain access to the indicated functionality.

4. The non-transitory computer-readable medium of claim 1 wherein the sign-on service is a single sign-on service, and wherein the stored contents are instructions that, when executed, program the configured computing device to perform the method.

5. The non-transitory computer-readable medium of claim 1 wherein the stored contents include one or more data structures for use in authorizing requests, the data structures comprising one or more entries that each corresponds to a client of the sign-on service and contains information comprising a predefined identifier associated with the client and associated predefined secret information for the client.

6. A configured computing system comprising:

a processor; and a memory with stored instructions that, when executed by the processor, cause the processor to implement functionality of a sign-on service, including:

receiving, by the sign-on service, a request sent by a requester to perform a sign-on of a user to the sign-on service, wherein the requester is an online site with which the user is interacting, and wherein the received request includes a digital signature that is generated by the requester based at least in part on first information included in the request and on other second information specific to the requester that is not included in the request, the other second information being predefined secret information for the requester;

verify that the requester is authorized based at least in part on the other second information matching a stored copy at the sign-on service of the predefined secret information;

determine that received sign-on information for the user is valid;

perform, based on the verifying that the requester is authorized and on the determining that the received sign-on information for the user is valid, a sign-on of the user to the sign-on service, and provide a credential from the sign-on service to the requester to represent the user in future interactions between the requester and the sign-on service; and after the providing of the credential to the requester, respond to a second request from the requester to the sign-on service that includes the credential and that indicates a service for the sign-on service to invoke on behalf of the user, wherein the responding to the second request includes invoking the indicated service based at least in part on the credential being included in the second request.

7. The computing system of claim 6 wherein the stored instructions further configured the processor to register the requester before the receiving of the request, the registering including storing a copy of a secret access key for use as the predefined secret information for the requester, and including determining a non-secret unique identifier associated with the secret access key, and wherein the received request includes the non-secret unique identifier to enable the sign-on service to retrieve the stored copy of the predefined secret information.

8. The computing system of claim 6 wherein the verifying that the requester is authorized includes generating, by the sign-on service, a new digital signature and determining that the new digital signature matches the digital signature included in the request, and wherein the generating of the new digital signature is based on the first information included in the request and on the stored copy of the predefined secret information.

9. The computing system of claim 6 wherein the stored instructions further configured the processor to verify that the second request is authorized before performing the invoking of the indicated service, the verifying that the second request is authorized including verifying that the requester is authorized to request the invoking of the indicated service.

10. The computing system of claim 6 wherein the received sign-on information for the user is included in the received request, and wherein the providing of the credential to the requester is based at least in part on success in the performing of the sign-on and includes generating, by the sign-on service, the credential for the user by retrieving previously stored information specific to the user.

11. The computing system of claim 10 wherein the sign-on service is a single sign-on service, and wherein the stored instructions are part of the single sign-on service.

12. The computing system of claim 6 wherein the determining that the received sign-on information for the user is valid includes, after the receiving of the request, sending a sign-on Web page to the user to allow the user to designate the sign-on information.

13. A computer-implemented method comprising:
receiving, by one or more configured computing systems of a sign-on service, an electronic request from an indicated requester to obtain indicated functionality on behalf of a user, the received request including information associated with the user and including a digital signature that is generated using first information that is included in the request and using other second information associated with the indicated requester that is not included in the request;
verifying, by the one or more configured computing systems, that the request is from the indicated requester based at least in part on the other second information being defined secret information associated with the indicated requester;
after verifying that the request is from the indicated requester, initiating providing the indicated functionality on behalf of the user;
providing, by the one or more configured computing systems and based at least in part on the information associated with the user included in the received request, a credential to the requester to represent the user in future actions; and
after the providing of the credential to the requester, responding to a second electronic request from the requester that includes the credential by providing second indicated functionality on behalf of the user, the providing of the second indicated functionality being based at least in part on the credential being included in the second electronic request.

14. The method of claim 13 wherein the verifying that the request is from the indicated requester includes generating a new digital signature and determining that the new digital signature matches the digital signature included in the request, the generating of the new digital signature being based on the first information included in the request and on a stored copy of the defined secret information.

15. The method of claim 14 further comprising, before the generating of the new digital signature, retrieving the stored copy of the defined secret information based on an identifier associated with the indicated requester that is included with the received request.

16. The method of claim 13 wherein the verifying that the request is from the indicated requester further includes verifying an identity of the indicated requester.

17. The method of claim 13 wherein the request is an electronic message that includes sign-on information for the user, and wherein the initiating providing of the indicated functionality includes performing a sign-on of the user to the sign-on service using the sign-on information.

18. The method of claim 17 wherein the performing of the sign-on of the user includes, after the receiving of the request, sending a sign-on Web page to the user to allow the user to designate the sign-on information.

19. The method of claim 17 wherein the information associated with the user that is included in the received request is sign-on information for the user, and wherein the providing of the credential to the requester is based on successful use of the sign-on information in the performing of the sign-on of the user and includes generating, by the one or more configured computing systems, to include previously stored information specific to the user.

20. The method of claim 17 wherein the sign-on service is a single sign-on service, and wherein the one or more configured computing systems provide the single sign-on service.

21. The method of claim 17 further comprising, before the receiving of the request, registering the indicated requester with the sign-on service by obtaining information for the requester that includes a non-secret unique identifier and a secret access key known to the requester, wherein the non-secret unique identifier is included in the received request, and wherein the secret access key is the defined secret information associated with the indicated requester.

22. The method of claim 13 wherein the defined secret information associated with the indicated requester is a shared secret between the indicated requester and the sign-on service.

23. The method of claim 13 further comprising receiving a third electronic request from a second indicated requester to obtain the indicated functionality, and preventing access to the indicated functionality for the third electronic request based at least in part on the second indicated requester not being verified as an authorized requester.

* * * * *